United States Patent
Mukherjee et al.

(10) Patent No.: US 8,541,357 B2
(45) Date of Patent: Sep. 24, 2013

(54) CLEANING COMPOSITIONS WITH AMPHOTERIC POLYCARBOXYLATE POLYMERS

(75) Inventors: Koushik Mukherjee, Beijing (CN); Kenneth Nathan Price, Cincinnati, OH (US); Yoneda Atsuro, Osaka (JP); Michitaka Daisuke, Osaka (JP)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 13/328,120

(22) Filed: Dec. 16, 2011

(65) Prior Publication Data

US 2012/0231991 A1    Sep. 13, 2012

(30) Foreign Application Priority Data

Dec. 17, 2010   (WO) ................ PCT/CN2010/079952

(51) Int. Cl.
*C11D 1/12* (2006.01)
*C08F 220/06* (2006.01)

(52) U.S. Cl.
USPC ........... 510/475; 510/360; 510/361; 510/426; 510/434; 510/477; 510/480; 510/499; 510/504

(58) Field of Classification Search
CPC ...... C11D 1/12; C11D 3/3707; C11D 3/3723; C11D 3/3796; C08F 216/1458; C08F 220/06
USPC ............... 510/360, 361, 426, 434, 475, 477, 510/480, 499, 504
See application file for complete search history.

(56) References Cited

U.S. PATENT DOCUMENTS

| | | | |
|---|---|---|---|
| 6,310,156 B1 | 10/2001 | Maeda et al. | |
| 6,451,952 B2 | 9/2002 | Yamaguchi et al. | |
| 6,943,222 B2 | 9/2005 | Yoneda et al. | |
| 6,998,453 B2 | 2/2006 | Yoneda et al. | |
| 7,132,487 B2 | 11/2006 | Yoneda et al. | |
| 7,285,611 B2 | 10/2007 | Yoneda et al. | |
| 8,106,149 B2 | 1/2012 | Yoneda et al. | |
| 2011/0183880 A1 | 7/2011 | Yoneda et al. | |
| 2011/0245130 A1 | 10/2011 | Dupont et al. | |
| 2011/0245132 A1 | 10/2011 | Dupont et al. | |
| 2011/0245133 A1 | 10/2011 | Dupont et al. | |
| 2011/0251115 A1 | 10/2011 | Dupont et al. | |
| 2012/0227195 A1 | 9/2012 | Mukherjee et al. | |
| 2012/0227196 A1 | 9/2012 | Mukherjee et al. | |
| 2012/0238717 A1* | 9/2012 | Yoneda et al. ................ 526/273 |

FOREIGN PATENT DOCUMENTS

| | | | |
|---|---|---|---|
| JP | 2011116813 A | | 6/2011 |
| WO | WO 2011/068209 | * | 6/2011 |

OTHER PUBLICATIONS

International Search Report, dated Aug. 5, 2011, containing 12 pages.

* cited by examiner

*Primary Examiner* — Brian P Mruk
(74) *Attorney, Agent, or Firm* — Melissa G Krasovec

(57) ABSTRACT

Cleaning compositions and laundry detergents comprising amphoteric polymers are disclosed. The amphoteric polymers may be comb polymers having polycarboxylate backbones and polyalkoxylate tentacles. In particular, the amphoteric polymer includes: a cationic group structure unit derived from a cationic group-containing monomer; and a carboxyl structure unit derived from a carboxyl group-containing monomer. The cationic group structure unit may be present at a level of 1% to 99% by mass based on 100% by mass of all structure units derived from all monomers in the amphoteric polymer. The carboxyl structure unit may be present at a level of 1% to 99% by mass based on 100% by mass of all the structure units derived from all the monomers in the amphoteric polymer. The cleaning compositions have high anti-soil redeposition ability and solubility with surfactants.

20 Claims, No Drawings

CLEANING COMPOSITIONS WITH AMPHOTERIC POLYCARBOXYLATE POLYMERS

TECHNICAL FIELD

Embodiments described herein relate to cleaning compositions, including especially fabric and home care cleaning compositions, and including especially laundry cleaning compositions. More specifically, embodiments described herein relate to cleaning compositions comprising amphoteric polycarboxylate polymers.

BACKGROUND

The required level of performance of detergent additives has been rising with growing concern of consumers for environmental problems. For example, many consumers have been changing their washing machines to drum washing machines to reduce water consumption and drainage. In washing treatment under water-saving conditions, soil redeposition on clothes is a more serious problem compared to under conditions in which a large amount of water is used.

Therefore, the required level of anti-soil redeposition ability of detergent additives is higher than before. For drum washing machines, which use less water, liquid detergents are likely to be chosen because they are likely to dissolve without residue. Accordingly, there is a growing demand for liquid detergents, particularly concentrated liquid detergents whose surfactant content is not less than 50%. This demand has created a need for detergent additives that are suitably used in concentrated liquid detergents and are more compatible with surfactants than conventional detergent additives. Nonetheless, powder detergents continue to be a significant part of the detergent market, especially in developing countries.

SUMMARY

Cleaning compositions according to embodiments described herein comprise amphoteric polymers that provide improved cleaning benefits, even at lower surfactant levels or at reduced temperatures.

The amphoteric polymers are formed from a plurality of structure units together defining a total mass. From 1% to 99% by mass of said plurality of structure units, based on the total mass, are cationic-group structure units having formula (IB) or (IIB):

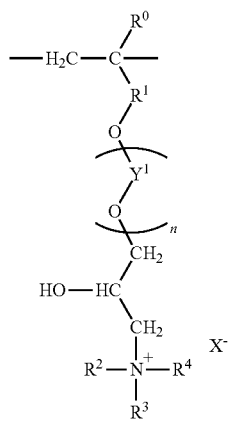

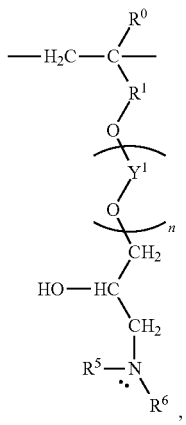

where $R^0$ is —H or —$CH_3$; $R^1$ is —$CH_2$—, —$CH_2CH_2$—, or a direct bond; $R^2$, $R^3$, and $R^4$ each are independently selected from $C_{1-20}$ organic groups; $R^5$ and $R^6$ each are independently selected from —H and $C_{1-20}$ organic groups; each $Y^1$ is independently selected from $C_{2-20}$ alkylene groups; n is from 1 to 300 and represents an average addition number of moles of oxyalkylene groups (—$Y^1$—O—); and $X^-$ is a counteranion. From 1% to 99% by mass of the plurality of structure units, based on the total mass of the plurality of structure units, are carboxyl structure units each derived from a carboxyl group-containing monomer.

In example embodiments, cleaning compositions comprising the amphoteric polymers may further comprise a surfactant system containing one or more surfactant and, optionally, one or more co-surfactant.

In further example embodiments, the cleaning compositions may be incorporated into a cleaning implement comprising a nonwoven substrate.

These and other features, aspects, and advantages of the embodiments will become better understood with reference to the following description and appended claims.

DETAILED DESCRIPTION

Features and advantages of the invention now will be described with occasional reference to specific embodiments. However, the invention may be embodied in different forms and should not be construed as limited to the embodiments set forth herein. Rather, these embodiments are provided so that this disclosure will be thorough and complete and will fully convey the scope of the invention to those skilled in the art.

The present inventors have found that amphoteric polymers have high anti-soil redeposition ability and compatibility with surfactants. The amphoteric polymers are suitable for use in cleaning compositions including, but not limited to, laundry detergents. As used herein, the term "amphoteric polymer" is intended to include polymers that contain both of a cationic group and an anionic group in the molecular structure. Furthermore, it is noted that any combination of any two or more preferred examples or embodiments described herein shall itself compose a preferred example or embodiment.

The present inventors have found also that amphoteric polymers having an anionic group and cationic group separated from each other by a nonionic spacer such as a polyalkylene glycol chain are promising candidates for detergent additives. The amphoteric polymers may improve the dispersability of soil particles, a contributing factor to washing performance. Moreover, the present inventors have found that a polymer containing (1) a structure unit derived from a specific cationic group-containing monomer and (2) a structure unit derived from a carboxyl group-containing monomer has high anti-soil redeposition ability and compatibility with surfactants. Furthermore, the present inventors found that a polymer containing the structure units at levels adjusted within a specific range has improved performance, and that such a polymer is suitably used as a detergent additive.

According to example embodiments, a cleaning composition comprises one or more amphoteric polymer formed from a plurality of structure units together defining a total mass. Each amphoteric polymer contains: a cationic group structure unit derived from a cationic group-containing monomer represented by the formula (IA) or (IIA):

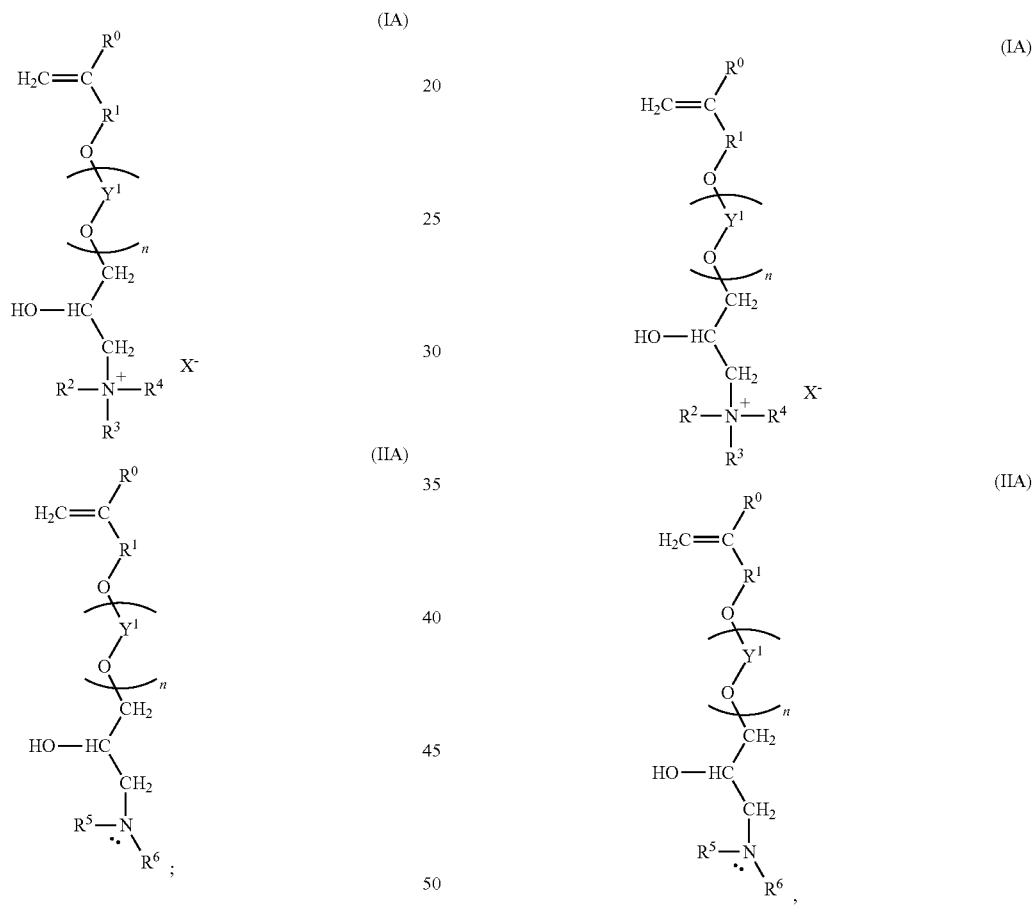

and a carboxyl structure unit derived from a carboxyl group-containing monomer. The cationic group structure unit may be present at a level of 1% to 99% by mass based on 100% by mass of all structure units derived from all monomers in the amphoteric polymer, and the carboxyl structure unit may be present at a level of 1% to 99% by mass based on 100% by mass of all the structure units derived from all the monomers in the amphoteric polymer.

In formulas (IA) and (IIA), $R^0$ represents H or $CH_3$; $R^1$ represents $CH_2$, $CH_2CH_2$, or a direct bond; $R^2$, $R^3$, and $R^4$ each represent a $C_{1-20}$ organic group, and each of $R^2$, $R^3$, and $R^4$ may be the same as or different from each other; $R^5$ and $R^6$ each represent H or a $C_{1-20}$ organic group and may be the same as or different from each other; $Y^1$ represents a $C_{2-20}$ alkylene group, and each $Y^1$ may be the same as or different from each other; n represents an average addition number of moles of oxyalkylene groups ($-Y^1-O-$) and is from 1 to 300; and $X^-$ represents a counteranion.

The amphoteric polymers may be prepared by a process including polymerizing a cationic group-containing monomer represented by the formula (IA) or (IIA), as shown above, and a carboxyl group-containing monomer. In the process, the cationic group-containing monomer is added at a level of 1% to 99% by mass based on 100% by mass of all monomers to be added, and the carboxyl group-containing monomer is added at a level of 1% to 99% by mass based on 100% by mass of all the monomers to be added.

Cationic Group-Containing Monomer

The amphoteric polymers each contain one or more cationic group structure units derived from a cationic group-containing monomer having the formula (IA) or (IIA):

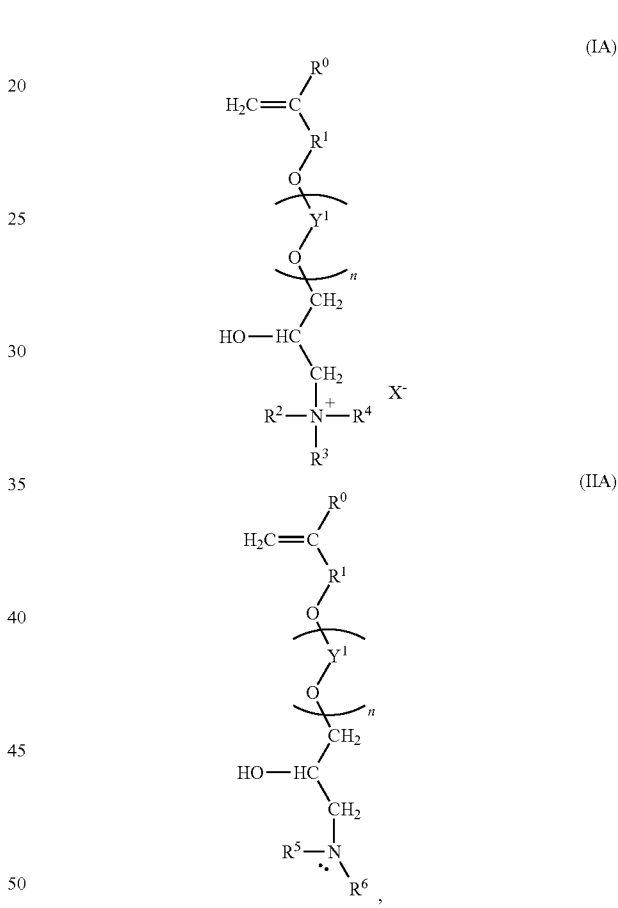

where $R^0$ represents H or $CH_3$; $R^1$ represents $CH_2$, $CH_2CH_2$, or a direct bond; $R^2$, $R^3$, and $R^4$ each represent a $C_{1-20}$ organic group, and each of $R^2$, $R^3$, and $R^4$ may be the same as or different from each other; $R^5$ and $R^6$ each represent H or a $C_{1-20}$ organic group and may be the same as or different from each other; $Y^1$ represents a $C_{2-20}$ alkylene group, and each of $Y^1$s may be the same as or different from each other; n represents an average addition number of moles of oxyalkylene groups ($-Y^1-O-$) and is from 1 to 300; and $X^-$ represents a counteranion.

The amphoteric polymers may contain at least one of cationic group structure unit derived from a cationic group-containing monomer represented by the formula (IA) and at least one cationic group structure unit derived from a cationic group-containing monomer having formula (IIA). That is, the amphoteric polymers may contain only one of the types of structure units derived from monomers of formulas (IA) and (IIA) or may contain both types of structure units derived from monomers of formulas (IA) and (IIA).

As used herein, the term "cationic groups" refers to groups that are converted to cations in the presence of an acid. As such, even though groups such as the amino group in the formula (IIA) are not shown as having a positive charge, because the amino group is converted to a cation in the presence of an acid, it is referred to herein as a cationic group.

When $R^1$ in the formula (IA) or (IIA) is a direct bond, the structure $H_2C=C(R^0)-R^1-O-$ in the formula (IA) or (IIA) is $H_2C=C(R^0)-O-$. In addition, the following common moieties may be present in the formulas (IA) and (IIA) according to the definitions of the groups $R^0$ and $R^1$. For example, the formulas (IA) and (IIA) contain a methallyl group when $R^0$ is $CH_3$ and $R^1$ is $CH_2$; an isoprenyl group when $R^0$ is $CH_3$ and $R_1$ is $CH_2CH_2$; an isopropenyl group when $R^0$ is $CH_3$ and $R_1$ is a direct bond; an allyl group when $R^0$ is H and $R^1$ is $CH_2$; a butenyl group when $R^0$ is H and $R^1$ is $CH_2CH_2$; and a vinyl group when $R^0$ is H and $R^1$ is a direct bond.

The group containing the polymerizable double bond between carbons, that is, $H_2C=C(R^0)-R^1-$ in the cationic group-containing monomer is preferably an isoprenyl group, methallyl group, allyl group, or vinyl group. Isoprenyl, methallyl, and allyl groups are more preferable, and isoprenyl and methallyl groups are further more preferable because they provide high polymerizability.

In the formula (IA), $R^2$, $R^3$, and $R^4$ each represent a $C_{1-20}$ organic group, and each of $R^2$, $R^3$, and $R^4$ may be the same as or different from each other. In the formula (IIA), $R^5$ and $R^6$ each represent a $C_{1-20}$ organic group and may be the same as or different from each other. The $C_{1-20}$ organic groups are not particularly limited, provided that they contain from 1 to 20 carbon atoms in total. Preferred examples thereof include alkyl groups, aryl groups, and alkenyl groups. When the organic groups are alkyl groups, aryl groups, and/or alkenyl groups, one or two hydrogen atoms therein may or may not be substituted with other organic group(s). Examples of the other organic groups include alkyl groups (in this case, when the organic groups represented by $R^2$, $R^3$, and/or $R^4$ are alkyl groups, the organic groups with substitutent(s) are regarded as unsubstituted alkyl groups as a whole), aryl groups, alkenyl groups, alkoxy groups, hydroxyl group, acyl groups, ether groups, amide groups, ester groups, ketone groups, carboxyl group, carboxylate group, sulfonic acid group, and sulfonate groups.

The number of carbons in each of $R^2$, $R^3$, $R^4$, $R^5$ and $R^6$ is preferably from 1 to 8, more preferably from 1 to 5, and further more preferably 1 or 2. These structures enable the cationic group-containing monomer to be produced with high yield and therefore improve the polymerizability of the monomer and the purity of the resulting polymer. In addition, the anti-soil redeposition ability of the resulting polymer may be improved.

Specific examples of $R^2$, $R^3$, and $R^4$ include alkyl groups such as methyl group, ethyl group, isopropyl group, n-propyl group, n-butyl group, isobutyl group, octyl group, lauryl group, stearyl group, cyclohexyl group, and 2-ethylhexyl group; alkenyl groups such as butylene group, octylene group, and nonylene group; aryl groups such as phenyl group, benzyl group, phenethyl group, 2,3- and 2,4-xylyl groups, mesityl group, and naphthyl group; and groups obtained by substituting part of hydrogen atoms in the above groups with alkoxy groups, carboxyl ester groups, amino groups, amide groups, hydroxyl groups, carboxyl groups, carboxylate groups, sulfonic acid groups, and sulfonate groups (e.g. hydroxyethyl group, hydroxypropyl group). Among these examples, methyl group and ethyl group are preferable because they improve the anti-soil redeposition ability of the resulting polymer.

$R^2$ and $R^3$ in the formula (IA) and $R^5$ and $R^6$ in the formula (IIA) may be linked to each other and form a ring together. In this case, the ring composed of the nitrogen atom, $R^2$, and $R^3$ and the ring composed of the nitrogen atom, $R^5$, and $R^6$ are preferably three- to seven-membered rings because these ring structures are stable. Namely, both of the total number of the carbon atoms in $R_2$ and $R_3$ and the total number of the carbon atoms in $R^5$ and $R^6$ are preferably from 2 to 6.

In the formulas (IA) and (IIA), $Y^1$ is a $C_{2-20}$ alkylene group, and each $Y^1$ may be the same as or different from each other. $Y^1$ is preferably a $C_{2-4}$ alkylene group, and more preferably a $C_{2-3}$ alkylene group because they improve the polymerizability of the cationic group-containing monomer. Specifically, $C_{2-4}$ alkylene groups such as ethylene group, propylene group, and butylene group are preferable, and $C_{2-3}$ alkylene groups such as ethylene group and propylene group are more preferable. The cationic group-containing monomer may contain one or more of the above alkylene groups. In the case that the cationic group-containing monomer contains two or more of the alkylene groups, the added oxyalkylene groups each represented by $-Y^1-O-$ may be arranged in any manner including, but not limited to, random, block, and alternating arrangements.

In the formula (IA), n represents an average of the number of the added oxyalkylene groups ($-Y^1-O-$) and is from 1 to 300. Preferably, n is not less than 5, more preferably not less than 10. With these structures, the anionic group and the cationic group in the resulting polymer are separated from each other such that the anti-soil redeposition ability of the polymer may be strikingly improved. To ensure high polymerizability of the cationic group-containing monomer, n is preferably not more than 200, more preferably not more than 150, and further more preferably not more than 100.

When the cationic group-containing monomer includes a quaternary nitrogen atom, the counteranion $X^-$ is present near the quaternary nitrogen atom. The counteranion $X^-$ is not particularly limited but is preferably selected from halogen ions, alkyl sulfate ions and organic acid ions. Specific examples of halogen ions include chlorine ion, bromine ion, iodine ion, and fluorine ion. Among these, chlorine ion, bromine ion, and iodine ion are preferable, and chlorine ion is more preferable. Specific examples of alkyl sulfate ions include methyl sulfate ion, and ethyl sulfate ion. Among these, methyl sulfate ion is preferable. Acetate ion ($CH_3COO-$) and propionate ion ($CH_3CH_2COO^-$) are preferable for organic acid ions.

The amphoteric polymers contain the cationic group structure unit derived from the cationic group-containing monomer having formula (IA) or (IIA). Generally, the cationic group structure unit is represented by the formula (IB) or (IIB):

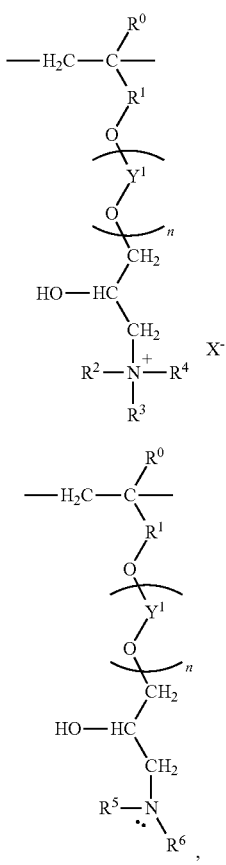

in which the double bond between carbon atoms in the cationic group-containing monomer is converted to a single bond. In the formula, $R^0$ represents H or $CH_3$; $R^1$ represents $CH_2$, $CH_2CH_2$, or a direct bond; $R^2$, $R^3$, and $R^4$ each represent a $C_{1-20}$ organic group, and each of $R^2$, $R^3$, and $R^4$ may be the same as or different from each other; $R^5$ and $R^6$ each represent H or a $C_{1-20}$ organic group and may be the same as or different from each other; $Y^1$ represents a $C_{2-20}$ alkylene group, and each of $Y^1$s may be the same as or different from each other; n represents an average addition number of moles of oxyalkylene groups ($—Y^1—O—$) and is from 1 to 300; and $X^-$ represents a counteranion.

As used herein, the phrase "the amphoteric polymer contains cationic group structure units derived from cationic group-containing monomers" means that the final polymer product contains structure units represented by the formula (IB) and/or structure units represented by the formula (IIB). Specifically, the term "cationic group structure unit derived from the cationic group-containing monomer" used herein is intended to encompass amphoteric polymers having structure units introduced in a step before or after the polymerization reaction. For example, structure units may be added before or after the polymerization reaction by introducing side chains after a main chain structure of the amphoteric polymer is formed by copolymerization. In addition, structure units may be introduced in the polymer by synthesizing the cationic group-containing monomer and then copolymerizing the cationic group-containing monomer with other monomers.

The amphoteric polymer may contain cationic group structure units at a level of 1% to 99% by mass based on the total mass defined by the plurality of structure units forming the amphoteric polymer. Thus, the total mass represents 100% by mass of all structure units derived from all monomers in the amphoteric polymer (i.e., the cationic group structure units, the carboxyl structure units, and the additional structure units, described below). With the cationic group structure unit at a level within this range, the polymer may exhibit improved anti-soil redeposition ability and compatibility with surfactants. The level of the cationic group structure unit is preferably 2% to 90% by mass, more preferably 3% to 70% by mass, and further more preferably 5% to 40% by mass. The mass ratio (% by mass) of the cationic group structure unit to all the structure units derived from all the monomers and the mass ratio of the cationic group-containing monomer to all the monomers are determined without including the mass contributed by any counteranions.

The cationic group structure units in the amphoteric polymers may all be of the same structure or may be of two or more different structures. When the amphoteric polymer contains the cationic group structure unit derived from the monomer represented by the formula (IA) and the cationic group structure unit derived from the monomer represented by the formula (IIA), the amount of the cationic group structure unit is determined by the total amount of the both structure units.

Preferably, the amphoteric polymers contain structure units represented by the formula (IB) as cationic group structure unit, because the structure unit having formula (IB) may provide particularly improved anti-soil redeposition ability. The amphoteric polymer preferably may contain the structure unit represented by the formula (IB) at a level of 1% to 99% by mass based on 100% by mass of all the structure units derived from all the monomers in the amphoteric polymer.

In practical terms, preferred examples of the amphoteric polymers are comb polymers having a polycarboxylate backbone (for example, a polyacrylate/maleate backbone) with polyalkoxylate tentacles (for example, polyethylene oxide) terminated with a nitrogen-containing moiety that is either a formal quaternary unit (as in (IB)) or a primary, secondary, or tertiary amine (as in (IIB)). The polymers may also contain polyalkoxylate tentacles not terminated with a nitrogen-containing moiety. Without wishing to be bound by theory, it is believed that the effectiveness of the amphoteric polymers in cleaning compositions derives from the ability of the amphoteric polymers to have the nitrogen-containing units bind to fabric or clay via charge or hydrogen bonding modes, and to have said nitrogen-containing units separated from the main chain by relatively long polyalkoxylate tentacles. Furthermore, the main chain polycarboxylate acts to provide charge stabilization to either provide a fabric with negative charges which act as soil repellancy motifs, or to increase the suspendability of clay and other particulate matter via charge stabilization mechanisms. The selections of $R^2$, $R^3$, $R^4$, $R^5$, and $R^6$ allow the formulator to optimize the ability of the nitrogen moiety ability to bind to different target soil or fabric surfaces, and furthermore to render the polymer compatible with powder or liquid detergent matrixes either in neat form or in the wash liquor. In structure (IB), the nitrogen moiety is a formal quaternary unit, and is especially effective for powder laundry detergent formulations, though it may also be effective in heavy-duty liquid laundry detergent formulations. The length of the $R^2$, $R^3$, and $R^4$ moieties manages surfactant interactions as well as surface-seeking and surface-binding properties. In structure (IIB), the nitrogen moiety is a primary, secondary, or tertiary amine, which allows hydrogen-bonding donor and/or acceptor modes of interaction with fabric or particulate matter (for example clays). Furthermore, in products with neutral, near-neutral, or acidic pH, the amino moeity becomes protonated and acts as a cationic or pseudocationic moiety providing soil or fabric seeking mechanisms via charge-mediated binding. Furthermore, based on the matrix and desired benefits, the formulator can choose the ratio of nitrogen group-containing monomers and carboxyl group-containing monomers as well as polyalkoxylate-containing monomers not terminated with a nitrogen-containing moiety. Finally, the skill of the polymer designer and formulator is required in choosing the correct ratio of monomers and correct $R^2$, $R^3$, $R^4$, $R^5$, and $R^6$ moieties, for example, because too high a number of nitrogen-containing moieties can lead to flocculation and other negatives.

Process for Preparing Cationic Group-Containing Monomers

The above cationic group-containing monomers may be prepared by polymerization techniques well known in the art. Preferably, the above cationic group-containing monomers may be prepared by reacting a polyalkylene glycol chain-containing monomer represented by the formula (III):

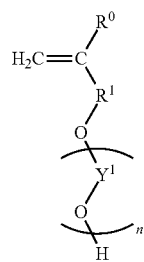

with an epihalohydrin (for example, epichlorohydrin), either (1) in the presence of a catalyst or (2) in the presence of an alkali compound. The product of (1) may be reacted with a tertiary amine to form a monomer having formula (IIA). The product of (2) may be reacted with a secondary amine to form a monomer having formula (IA), which subsequently may be reacted with a quaternizing agent to form a monomer having formula (IIA). Alternatively, the product of (2) may be reacted with a tertiary amine directly to form a monomer having formula (IIA).

Carboxyl Group-Containing Monomer

The amphoteric polymers further contain one or more carboxyl structure unit derived from a carboxyl group-containing monomer. The carboxyl group-containing monomer is a monomer containing (1) an unsaturated double bond; and (2) a carboxyl group and/or a salt thereof. Specific examples of carboxyl group-containing monomers include unsaturated carboxylic acid-based monomers such as unsaturated monocarboxylic acids (e.g., acrylic acid, methacrylic acid, crotonic acid, α-hydroxyl acrylic acid, α-hydroxyl methylacrylic acid, derivatives of these), and salts of these; and unsaturated dicarboxylic acid-based monomers such as unsaturated dicarboxylic acids (e.g. itaconic acid, fumaric acid, maleic acid, citraconic acid, 2-methylene glutaric acid), and salts of these. The carboxyl structure units in the amphoteric polymers may all be of the same structure or may be of two or more different structures.

Any unsaturated dicarboxylic acid-based monomer may be used, provided that it contains an unsaturated group and two carboxyl groups in the molecular structure, and suitable examples thereof include maleic acid, itaconic acid, citraconic acid, and fumaric acid; monovalent metal salts, divalent metal salts, ammonium salts, and organic ammonium salts (organic amine salts) of the above acids; and anhydrides of the above examples. Among these examples of the carboxyl group-containing monomer, acrylic acid, acrylates, maleic acid, and maleates are preferable because they remarkably improve the anti-soil redeposition ability of the resulting amphoteric polymer. It is more preferable to use acrylic acid or an acrylate.

Suitable examples of salts of the unsaturated monocarboxylic acids and unsaturated dicarboxylic acids include metal salts, ammonium salts, and organic amine salts. Examples of the metal salts include monovalent alkali metal salts such as sodium salts, lithium salts, and potassium salts; alkaline-earth metal salts such as magnesium salts and calcium salts; and salts of other metals such as aluminum salts and iron salts. Examples of the organic amine salts include alkanolamine salts such as monoethanolamine salts, diethanolamine salts, and triethanolamine salts; alkylamine salts such as monoethylamine salts, diethylamine salts, and triethylamine salts; and organic amine salts such as polyamines including ethylenediamine salts and triethylenediamine salts. Ammonium salts, sodium salts, and potassium salts are preferable among these because they remarkably improve the anti-soil redeposition ability of the resulting copolymer. Sodium salts are more preferable.

In addition to the above examples, examples of the carboxyl group-containing monomer include half esters of unsaturated dicarboxylic acids and $C_{1-22}$ alcohols, half amides of unsaturated dicarboxylic acids and $C_{1-22}$ amines, half esters of unsaturated dicarboxylic acids and $C_{2-4}$ glycols, and half amides of maleamic acid and $C_{2-4}$ glycols.

In the carboxyl structure unit derived from the carboxyl group-containing monomer, the unsaturated double bond in the carboxyl group-containing monomer is converted to a single bond. The phrase "the amphoteric polymer contains the carboxyl structure unit derived from the carboxyl group-containing monomer" means that the final polymer product contains a structure unit in which the unsaturated double bond in the carboxyl group-containing monomer is converted to a single bond.

In the amphoteric polymers, the carboxyl structure unit may be present at a level of 1% to 99% by mass based on 100% by mass of all the structure units derived from all the monomers in the amphoteric polymer (i.e., the cationic group structure units, the carboxyl structure units, and the additional structure units, described below). With the carboxyl structure unit at a level within this range, the polymer may exhibit improved anti-soil redeposition ability and compatibility with surfactants. The level of the carboxyl structure unit is preferably 10% to 95% by mass, more preferably 20% to 90% by mass, and further more preferably 30% to 85% by mass based on 100% by mass of all the structure units derived from all the monomers.

When the mass ratio (% by mass) of the carboxyl structure unit derived from the carboxyl group-containing monomer to all the structure units derived from all the monomers is calculated, the carboxyl structure unit is treated as the corresponding acid. In the example case of the structure unit —$CH_2$—CH(COONa)— derived from sodium acrylate, the mass ratio (% by mass) of the structure unit derived from the corresponding acid acrylic acid, that is, the mass ratio (% by mass) of the structure unit —$CH_2$—CH(COOH) is calculated. When the mass ratio (% by mass) of the carboxyl group-containing monomer to all the monomers is calculated, the carboxyl group-containing monomer is similarly treated as the corresponding acid. For example, to determine the mass ratio of sodium acrylate, the mass ratio (% by mass) of the corresponding acid acrylic acid is calculated instead.

Owing to the carboxyl structure unit contained at a level within the above specific range, the amphoteric polymers have high water solubility and can disperse soil particles through interactions of the soil particles with the cationic group structure unit when the amphoteric polymer is used as a detergent builder.

Additional Monomer and Additional Structure Unit

The amphoteric polymers optionally may contain one or more additional structure unit derived from other one or more additional monomer (where each additional monomer is a monomer not classified as a cationic group-containing monomer or a carboxyl group-containing monomer). The additional structure units in the amphoteric polymers may all be of the same structure or may be of two or more different structures.

The additional monomer(s) are not particularly limited, provided that they are copolymerizable with the cationic group-containing monomer and the carboxyl group-containing monomer. The additional monomer(s) are appropriately selected to provide a desired effect. Specific examples thereof include quaternized vinyl aromatic compound-based monomers having a heterocyclic aromatic hydrocarbon group such as vinyl pyridine and vinyl imidazole; and amino group-containing monomers. Examples of the amino group-containing monomers include quaternized aminoalkyl (meth) acrylates such as dimethylaminoethyl acrylate, dimethylaminoethyl methacrylate, dimethylaminopropyl acrylate, and aminoethyl methacrylate; quaternized allylamines such as diallylamine and diallyldimethylamine; quaternized monomers obtained by reacting tertiary amine salts with the epoxy rings of (meth)allyl glycidyl ether, isoprenyl glycidyl ether, vinyl glycidyl ether, and the like; quaternized allylamines such as diallylamine and diallyldimethylamine; quaternized monomers obtained by reacting secondary amines with the epoxy rings of (meth)allyl glycidyl ether, isoprenyl glycidyl ether, vinyl glycidyl ether, and the like, and by quaternizing the resulting monomers with known quaternizing agents; and quaternized amino (cationic) group-containing monomers other than the cationic group-containing monomer.

Preferred examples of the secondary amines include dialkylamines such as dimethylamine, diethylamine, diisopropylamine, and di-n-butylamine; alkanolamines such as diethanolamine and diisopropanolamine; and cyclic amines such as morpholine and pyrrole. Examples of known quaternizing agents include alkyl halides and dialkyl sulfate. Specific examples of the tertiary amine salts include trimethylamine hydrochloride and triethylamine hydrochloride. These salts may be hydrochlorides, organic acid salts, and the like.

In addition to the above examples, specific examples of the additional monomer(s) include sulfonic acid group-containing monomers such as vinylsulfonic acid, (meth)allyl sulfonic acid, isoprenesulfonic acid, 3-allyloxy-2-hydroxypropanesulfonic acid, and acrylamido-2-methylpropanesulfonic acid, and salts of these; polyalkyleneglycol chain-containing monomers such as the polyalkyleneglycol chain-containing monomer represented by the formula (III) above (preferred examples are the same as those of the above-mentioned polyalkyleneglycol chain-containing monomer represented by the formula (III)), (meth)acrylates of alkoxy alkylene glycols, and monomers obtained by adding alkylene oxides to (meth) allyl alcohol, isoprenol and the like; N-vinyl monomers such as N-vinylpyrrolidone, N-vinylformamide, N-vinylacetamide, N-vinyl-N-methylformamide, N-vinyl-N-methylacetamide, and N-vinyloxazolidone; amide-containing monomers such as (meth)acrylamide, N,N-dimethylacrylamide, and N-isopropylacrylamide; hydroxyl group-containing monomers such as (meth)allyl alcohol and isoprenol; alkyl (meth)acrylate-based monomers such as butyl(meth)acrylate, 2-ethylhexyl(meth)acrylate, and dodecyl(meth)acrylate; hydroxyalkyl (meth)acrylate-based monomers such as hydroxyethyl(meth)acrylate, 2-hydroxyethyl(meth)acrylate, hydroxybutyl(meth)acrylate, 2-hydroxybutyl(meth)acrylate, 4-hydroxybutyl(meth)acrylate, α-hydroxymethylethyl (meth)acrylate, hydroxypentyl(meth)acrylate, hydroxyneopentyl(meth)acrylate, and hydroxyhexyl(meth)acrylate; vinylaryl monomers such as styrene, indene, and vinylaniline; and other monomers such as isobutylene, and vinyl acetate.

In each additional structure unit derived from an additional monomer, the double bond in the additional monomer is converted to a single bond. The phrase "the amphoteric polymer contains additional structure units each derived an additional monomer" means that the final polymer product contains additional structure unit(s) in which the unsaturated double bond in the additional monomer is converted to a single bond.

When the amphoteric polymer contains optional additional structure unit(s) derived from the additional monomer(s), the additional structure unit(s) are preferably present at a level of 0% to 60% by mass, based on 100% by mass of all the structure units derived from all the monomers (100% by mass of the cationic group structure units, the carboxyl structure units, and the additional structure units), and more preferably 0% to 50% by mass of all the monomer units. In some embodiments, the amphoteric polymer preferably contains at least one additional structure unit derived from the polyalkyleneglycol chain-containing monomers of formula (III) above (including monomers obtained by adding alkylene oxides to (meth)allyl alcohol, isoprenol and the like), as the additional structure unit(s) derived from the additional monomer(s).

When the amphoteric polymer contains an additional structure unit derived from the polyalkyleneglycol chain-containing monomers of formula (III) above, the cationic-group structure unit is preferably present at a level of 2% to 89.9% by mass, more preferably 3% to 79.8% by mass, and further preferably 4% to 69.5% by mass; the carboxyl structure unit is preferably present at a level of 10% to 97.9% by mass, more preferably 20% to 96.8% by mass, and further preferably 30% to 95.5% by mass; and the additional structure unit derived from the polyalkyleneglycol chain-containing monomers of formula (III) is preferably present at a level of 0.1% to 20% by mass, more preferably 0.2% to 9% by mass, and further preferably 0.5% to 8% by mass, based on 100% by mass of all the monomer units derived from all the monomers. Note that even in the case that the amphoteric polymer contains the additional structure unit derived from the polyalkyleneglycol chain-containing monomers of formula (III), the amphoteric polymer may contain additional structure unit(s) other than the additional structure unit derived from the polyalkyleneglycol chain-containing monomers of formula (III). In this case, the entire amount of the additional structure unit(s) is preferably from 0.1% to 60% by mass, based on 100% by mass of all the monomer units derived from all the monomers. Without intent to be bound by theory, it is believed that these ranges are preferable in that they may improve anti-redeposition properties, stability when the amphoteric polymer is stored in aqueous form, and formability in producing powder detergent compositions.

When the mass ratio of a structure unit derived from an amino group-containing monomer to all the structure units derived from all the monomers is calculated, and when the mass ratio of the amino group-containing monomer to all the monomers is calculated, the structure unit and the monomer are treated as the corresponding unneutralized amine. For example, in the case that the additional monomer is vinylamine hydrochloride, the mass ratio (% by mass) of its corresponding unneutralized amine (i.e., vinylamine) is calculated instead. The mass ratios (% by mass) of quaternized amino group-containing monomers and structure units derived from the quaternized amino group-containing monomers are calculated without counting the mass of counteranion. When the additional structure unit is a structure unit derived from an acid group-containing monomer, the mass ratio (% by mass) of the additional structure unit to all the structure units derived from all the monomers is calculated by treating the structure unit as the corresponding acid. The mass ratio (% by mass) of the acid group-containing monomer to all the monomers is also calculated by treating the monomer as the corresponding acid.

Other Characteristics and Properties of Amphoteric Polymer

In the amphoteric polymers, the cationic group structure units and the carboxyl structure units are introduced at specific levels, and the additional structure unit(s) are optionally introduced at a specific level, as described above. These structure units may be arranged in either a random or block arrangement. The weight average molecular weight of the amphoteric polymers is not particularly limited and can be appropriately selected. Specifically, the amphoteric polymer has a weight average molecular weight preferably in the range of from 2,000 to 200,000, more preferably in the range of from 3,000 to 100,000, and further more preferably 4,000 to 60,000. The weight average molecular weight used herein may be determined by GPC (gel-permeation chromatography) and can be determined with the device under the measurement conditions described in the Examples below.

The amphoteric polymers exhibit high anti-soil redeposition ability. The anti-soil redeposition ratio can be measured by the procedure described in Examples below.

Preparation of Amphoteric Polymers

The amphoteric polymers may be produced by any method known in the art, for example, by copolymerizing monomers including (i) the cationic group-containing monomer; (ii) the carboxyl group-containing monomer; and optionally including additional monomer(s). Specific examples of polymerization methods include water-in-oil emulsion polymerization, oil-in-water emulsion polymerization, suspension polymerization, dispersion polymerization, precipitation polymerization, solution polymerization, aqueous solution polymerization, and bulk polymerization. Among these polymerization methods, aqueous solution polymerization and emulsion polymerization are preferable because they are highly safe methods and require only low production cost (polymerization cost). In such a production process, polymerization initiators can be used to copolymerize the monomers.

In the process for producing the amphoteric polymers, the ratios of the monomers used in polymerization to all the monomers (the cationic group-containing monomer, the carboxyl group-containing monomer, and the additional monomer(s)) are as follows: the cationic group-containing monomer is used at a level of 1% to 99% by mass based on 100% by mass of all the monomers; the carboxyl group-containing monomer is used at a level of 1% to 99% by mass based on 100% by mass of all the monomers; and the additional monomer(s) may be present at a level of 0% to 60% by mass based on 100% by mass of all the monomers (the cationic group-containing monomer, the carboxyl group-containing monomer, and the additional monomer(s)). The cationic group-containing monomer is preferably used at a level of 5% to 90% by mass, more preferably at a level of 10% to 80% by mass, and further more preferably 15% to 70% by mass. The carboxyl group-containing monomer is preferably used at a level of 10% to 95% by mass, more preferably at a level of 20% to 90% by mass, and further more preferably at a level of 30% to 85% by mass.

In some embodiments of the process for producing the amphoteric polymer, the additional monomers are preferably the polyalkyleneglycol chain-containing monomer of formula (III) (including monomers obtained by adding alkylene oxides to (meth)allyl alcohol, isoprenol and the like). The ratios of the additional monomers used in polymerization to all the monomers are as follows: the cationic group-containing monomer is preferably used at a level of from 2% to 89.9% by mass, more preferably from 3% to 79.8% by mass, and further preferably from 4% to 69.5% by mass; the carboxyl group-containing monomer is preferably used at a level of from 10% to 97.9% by mass, more preferably from 20% to 96.8% by mass, and further preferably from 30% to 95.5% by mass; and the polyalkyleneglycol chain-containing monomer of formula (III) is preferably used at a level of from 0.1% to 20% by mass, more preferably from 0.2% to 9% by mass, and further preferably from 0.5% to 8% by mass, based on 100% by mass of all the monomers. In additional embodiments, the monomers used for producing the amphoteric polymer may include additional monomers, as described above, other than the polyalkyleneglycol chain-containing monomer of formula (III). The entire amount of the additional monomers in such embodiments case is preferably from 0.1% to 60% by mass, based on 100% by mass of all the monomers.

Uses for of Amphoteric Polymers and Amphoteric Polymer Compositions

The amphoteric polymers (or amphoteric polymer composition) can be used as a coagulant, flocculating agent, printing ink, adhesive, soil control (modification) agent, fire retardant, skin care agent, hair care agent, additive for shampoos, hair sprays, soaps, and cosmetics, anion exchange resin, dye mordant, and auxiliary agent for fibers and photographic films, pigment spreader for paper making, paper reinforcing agent, emulsifier, preservative, softening agent for textiles and paper, additive for lubricants, water treatment agent, fiber treating agent, dispersant, additive for detergents, scale control agent (scale depressant), metal ion sealing agent, viscosity improver, binder of any type, emulsifier, and the like. When used as a detergent builder, the amphoteric polymers (or amphoteric polymer composition) can be added to detergents for various usages such as detergents for clothes, tableware, cleaning, hair, bodies, toothbrushing, and vehicles.

Fiber Treating Agents

The amphoteric polymers (or amphoteric polymer composition) can be used in fiber treating agents. Such fiber treating agents contain the amphoteric polymer described above (or amphoteric polymer composition) and at least one selected from the group consisting of dyeing agents, peroxides, and surfactants. In fiber treating agents, the amphoteric polymer preferably constitutes 1% to 100% by weight, and more preferably 5% to 100% by weight of the total amount. In addition, any suitable water soluble polymer may be included within a range of not affecting the performance or effect of this polymer. An example of the composition of such a fiber treating agent is described below. The fiber treating agent can be used in steps of scouring, dyeing, bleaching and soaping in fiber treatment. Examples of dyeing agents, peroxides, and surfactants include those commonly used in fiber treating agents.

The blending ratio between the amphoteric polymer and at least one selected from the group consisting of dyeing agents, peroxides, and surfactants is determined based on the amount of the purity-converted fiber treating agent per part by weight of the polymer. In a suitable example of a composition that is used as a fiber treating agent to provide improved degree of whiteness, color uniformity, and dyeing fastness of textiles, at least one selected from the group consisting of dyeing agents, peroxides, and surfactants is preferably used at a ratio of from 0.1 parts to 100 parts by weight per part by weight of the amphoteric polymer.

The fiber treating agent can be used for any suitable fibers including cellulosic fibers such as cotton and hemp, synthetic fibers such as nylon and polyester, animal fibers such as wool and silk thread, semisynthetic fibers such as rayon, and textiles and mixed products of these.

For a fiber treating agent used in a scouring step, an alkali agent and a surfactant are preferably used with the amphoteric polymer described above. For a fiber treating agent used in a bleaching step, a peroxide and a silicic acid-containing agent such as sodium silicate as a decomposition inhibitor for alkaline bleaches are preferably used with the amphoteric polymers described herein.

Detergent Builder or Dispersant

The amphoteric polymers (or amphoteric polymer compositions) can be used as a detergent builder or detergent dispersant also. The detergent builder or dispersant can be added to detergents for various usages such as detergents for clothes, tableware, cleaning, hair, bodies, toothbrushing, and vehicles.

Laundry Detergents

The amphoteric polymers according to the embodiments described above are suitable as soil detachment-promoting additives for cleaning compositions such as laundry detergents, for example. They exhibit high dissolving power especially in the case of greasy soil. It is of particular advantage that they display the soil-detaching power even at low washing temperatures.

The amphoteric polymers according to the embodiments described above can be added to the laundry detergents and cleaning compositions in amounts of generally from 0.05% to 10% by weight, from 0.1% to 15% by weight, preferably from 0.1% to 5% by weight, from 0.3% to 10% by weight, from 0.5% to 5% by weight, and more preferably from 0.25% to 2.5% by weight, based on the weight of the cleaning composition.

Suitable examples of enzymes that can be mixed in the detergent compositions include proteases, lipases, and cellulases. Among these, proteases, alkali lipases, and alkali cellulases are preferable because of their high activity in alkali-washing liquids.

In the detergent compositions, the enzymes are preferably used at a level of not more than 5% by mass based on 100% by mass of the total amount. The use of more than 5% by mass of the enzymes will not further improve the washing performance and may be disadvantageous in cost.

In addition, the laundry detergents and cleaning compositions generally comprise surfactants and, if appropriate, other polymers as washing substances, builders and further customary ingredients, for example cobuilders, complexing agents, bleaches, standardizers, graying inhibitors, dye transfer inhibitors, enzymes and perfumes.

The amphoteric polymers described herein may be utilized in laundry detergents or cleaning compositions comprising a surfactant system comprising $C_{10}$-$C_{16}$ alkyl benzene sulfonates (LAS) and one or more co-surfactants selected from nonionic, cationic, anionic or mixtures thereof. Alternately, the multi-polymer systems may be utilized in laundry detergents or cleaning compositions comprising surfactant systems comprising any anionic surfactant or mixture thereof with nonionic surfactants and/or fatty acids, optionally complemented by zwitterionic or so-called semi-polar surfactants such as the $C_{12}$-$C_{16}$ alkyldimethylamine N-oxides can also be used. In other embodiments, the surfactant used can be exclusively anionic or exclusively nonionic. Suitable surfactant levels are from about 0.5% to about 80% by weight of the detergent composition, more typically from about 5% to about 60% by weight.

A preferred class of anionic surfactants are the sodium, potassium and alkanolammonium salts of the $C_{10}$-$C_{16}$ alkylbenzenesulfonates which can be prepared by sulfonation (using $SO_2$ or $SO_3$) of alkylbenzenes followed by neutralization. Suitable alkylbenzene feedstocks can be made from olefins, paraffins or mixtures thereof using any suitable alkylation scheme, including sulfuric and HF-based processes. Any suitable catalyst may be used for the alkylation, including solid acid catalysts such as DETAL™ solid acid catalyst available commercially from UOP, a Honeywell company. Such solid acid catalysts include DETAL™ DA-114 catalyst and other solid acid catalysts described in patent applications to UOP, Petresa, Huntsman and others. It should be understood and appreciated that, by varying the precise alkylation catalyst, it is possible to widely vary the position of covalent attachment of benzene to an aliphatic hydrocarbon chain. Accordingly alkylbenzene sulfonates useful herein can vary widely in 2-phenyl isomer and/or internal isomer content.

The selection of co-surfactant may be dependent upon the desired benefit. In one embodiment, the co-surfactant is selected as a nonionic surfactant, preferably $C_{12}$-$C_{18}$ alkyl ethoxylates. In another embodiment, the co-surfactant is selected as an anionic surfactant, preferably $C_{10}$-$C_{18}$ alkyl alkoxy sulfates ($AE_xS$) wherein x is from 1 to 30. In another embodiment the co-surfactant is selected as a cationic surfactant, preferably dimethyl hydroxyethyl lauryl ammonium chloride. If the surfactant system comprises $C_{10}$-$C_{15}$ alkyl benzene sulfonates (LAS), the LAS is used at levels ranging from about 9% to about 25%, or from about 13% to about 25%, or from about 15% to about 23% by weight of the composition.

In one embodiment, the surfactant system may comprise from 0% to about 7%, or from about 0.1% to about 5%, or from about 1% to about 4% by weight of the composition of a co-surfactant selected from a nonionic co-surfactant, cationic co-surfactant, anionic co-surfactant and any mixture thereof.

Non-limiting examples of nonionic co-surfactants include: $C_{12}$-$C_{18}$ alkyl ethoxylates, such as, NEODOL® nonionic surfactants from Shell; $C_6$-$C_{12}$ alkyl phenol alkoxylates wherein the alkoxylate units are a mixture of ethyleneoxy and propyleneoxy units; $C_{12}$-$C_{18}$ alcohol and $C_6$-$C_{12}$ alkyl phenol condensates with ethylene oxide/propylene oxide block alkyl polyamine ethoxylates such as PLURONIC® from BASF; $C_{14}$-$C_{22}$ mid-chain branched alcohols, BA, as discussed in U.S. Pat. No. 6,150,322; $C_{14}$-$C_{22}$ mid-chain branched alkyl alkoxylates, $BAE_x$, where x is from 1 to 30, as discussed in U.S. Pat. Nos. 6,153,577, 6,020,303 and 6,093,856; alkylpolysaccharides as discussed in U.S. Pat. No. 4,565,647 Llenado, issued Jan. 26, 1986; specifically alkylpolyglycosides as discussed in U.S. Pat. Nos. 4,483,780 and 4,483,779; polyhydroxy fatty acid amides as discussed in U.S. Pat. No. 5,332,528; and ether capped poly(oxyalkylated) alcohol surfactants as discussed in U.S. Pat. No. 6,482,994 and WO 01/42408. Also useful herein as nonionic surfactants or co-surfactants are alkoxylated ester surfactants such as those having the formula $R^1C(O)O(R^{20})_nR^3$ wherein $R^1$ is selected from linear and branched $C_6$-$C_{22}$ alkyl or alkylene moieties; $R^2$ is selected from $C_2H_4$ and $C_3H_6$ moieties and $R^3$ is selected from H, $CH_3$, $C_2H_5$ and $C_3H_7$ moieties; and n has a value between 1 and 20. Such alkoxylated ester surfactants include the fatty methyl ester ethoxylates (MEE) and are well-known in the art; see for example U.S. Pat. Nos. 6,071,873; 6,319,887; 6,384,009; 5,753,606; WO 01/10391, WO 96/23049.

Non-limiting examples of semi-polar nonionic co-surfactants include: water-soluble amine oxides containing one alkyl moiety of from about 10 to about 18 carbon atoms and 2 moieties selected from the group consisting of alkyl moieties and hydroxyalkyl moieties containing from about 1 to about 3 carbon atoms; water-soluble phosphine oxides containing one alkyl moiety of from about 10 to about 18 carbon atoms and 2 moieties selected from the group consisting of alkyl moieties and hydroxyalkyl moieties containing from about 1 to about 3 carbon atoms; and water-soluble sulfoxides containing one alkyl moiety of from about 10 to about 18 carbon atoms and a moiety selected from the group consisting of alkyl moieties and hydroxyalkyl moieties of from about 1 to about 3 carbon atoms. See WO 01/32816, U.S. Pat. Nos. 4,681,704, and 4,133,779.

Non-limiting examples of cationic co-surfactants include: the quaternary ammonium surfactants, which can have up to 26 carbon atoms include: alkoxylate quaternary ammonium (AQA) surfactants as discussed in U.S. Pat. No. 6,136,769; dimethyl hydroxyethyl quaternary ammonium as discussed in U.S. Pat. No. 6,004,922; dimethyl hydroxyethyl lauryl ammonium chloride; polyamine cationic surfactants as discussed in WO 98/35002, WO 98/35003, WO 98/35004, WO 98/35005, and WO 98/35006; cationic ester surfactants as discussed in U.S. Pat. Nos. 4,228,042, 4,239,660 4,260,529 and 6,022,844; and amino surfactants as discussed in U.S. Pat. No. 6,221,825 and WO 00/47708, specifically amido propyldimethyl amine (APA).

Nonlimiting examples of anionic co-surfactants useful herein include: $C_{10}$-$C_{20}$ primary, branched chain and random alkyl sulfates (AS); $C_{10}$-$C_{18}$ secondary (2,3) alkyl sulfates; $C_{10}$-$C_{18}$ alkyl alkoxy sulfates ($AE_xS$) where x is from 1 to 30; $C_{10}$-$C_{18}$ alkyl alkoxy carboxylates comprising from 1 to 5 ethoxy units; mid-chain branched alkyl sulfates as discussed in U.S. Pat. Nos. 6,020,303 and 6,060,443; mid-chain branched alkyl alkoxy sulfates as discussed in U.S. Pat. Nos. 6,008,181 and 6,020,303; modified alkylbenzene sulfonate (MLAS) as discussed in WO 99/05243, WO 99/05242 and WO 99/05244; methyl ester sulfonate (MES); and alpha-olefin sulfonate (AOS). Anionic surfactants herein may be used in the form of their sodium, potassium or alkanolamine salts.

In example embodiments, cleaning compositions may comprise amphoteric polymers according to the embodiments described above, and also a surfactant system comprising $C_8$-$C_{18}$ linear alkyl sulphonate surfactant and a co-surfactant. The compositions can be in any form, namely, in the form of a liquid; a solid such as a powder, granules, agglomerate, paste, tablet, pouches, bar, gel; an emulsion; types delivered in dual-compartment containers; a spray or foam detergent; premoistened wipes (i.e., the cleaning composition in combination with a nonwoven material such as that discussed in U.S. Pat. No. 6,121,165, Mackey, et al.); dry wipes (i.e., the cleaning composition in combination with a non-woven materials, such as that discussed in U.S. Pat. No. 5,980,931, Fowler, et al.) activated with water by a consumer; and other homogeneous or multiphase consumer cleaning product forms. The composition may alternatively be in the form of a tablet or pouch, including multi-compartment pouches.

In one embodiment, the cleaning composition may be a liquid or solid laundry detergent composition. In another embodiment, the cleaning composition may be a hard surface cleaning composition, preferably wherein the hard surface cleaning composition impregnates a nonwoven substrate. As used herein "impregnate" means that the hard surface cleaning composition is placed in contact with a nonwoven substrate such that at least a portion of the nonwoven substrate is penetrated by the hard surface cleaning composition, preferably the hard surface cleaning composition saturates the non-woven substrate. The cleaning composition may also be utilized in car care compositions, for cleaning various surfaces such as hard wood, tile, ceramic, plastic, leather, metal, glass. This cleaning composition could be also designed to be used in a personal care and pet care compositions such as shampoo composition, body wash, liquid or solid soap and other cleaning composition in which surfactant comes into contact with free hardness and in all compositions that require hardness tolerant surfactant system, such as oil drilling compositions.

In another embodiment the cleaning composition is a dish cleaning composition, such as liquid hand dishwashing compositions, solid automatic dishwashing compositions, liquid automatic dishwashing compositions, and tab/unit dose forms of automatic dishwashing compositions.

Quite typically, cleaning compositions herein such as laundry detergents, laundry detergent additives, hard surface cleaners, synthetic and soap-based laundry bars, fabric softeners and fabric treatment liquids, solids and treatment articles of all kinds will require several adjuncts, though certain simply formulated products, such as bleach additives, may require only, for example, an oxygen bleaching agent and a surfactant as described herein. A comprehensive list of suitable laundry or cleaning adjunct materials can be found in WO 99/05242.

Common cleaning adjuncts include builders, enzymes, polymers not discussed above, bleaches, bleach activators, catalytic materials and the like excluding any materials already defined hereinabove. Other cleaning adjuncts herein can include suds boosters, suds suppressors (antifoams) and the like, diverse active ingredients or specialized materials such as dispersant polymers (e.g., from BASF Corp. or Rohm & Haas) other than those described above, color speckles, silvercare, anti-tarnish and/or anti-corrosion agents, dyes, fillers, germicides, alkalinity sources, hydrotropes, anti-oxidants, enzyme stabilizing agents, pro-perfumes, perfumes, solubilizing agents, carriers, processing aids, pigments, and, for liquid formulations, solvents, chelating agents, dye transfer inhibiting agents, dispersants, brighteners, suds suppressors, dyes, structure elasticizing agents, fabric softeners, anti-abrasion agents, hydrotropes, processing aids, and other fabric care agents, surface and skin care agents. Suitable examples of such other cleaning adjuncts and levels of use are found in U.S. Pat. Nos. 5,576,282, 6,306,812 B1 and 6,326,348 B1.

Methods of Use

Further embodiments may include a method for cleaning a targeted surface. As used herein "targeted surface" may include such surfaces such as fabric, dishes, glasses, and other cooking surfaces, hard surfaces, hair or skin. As used herein "hard surface" includes hard surfaces being found in a typical home such as hard wood, tile, ceramic, plastic, leather, metal, glass. Such method includes the steps of contacting the composition comprising the modified polyol compound, in neat form or diluted in wash liquor, with at least a portion of a targeted surface then optionally rinsing the targeted surface. Preferably the targeted surface is subjected to a washing step prior to the aforementioned optional rinsing step. As used herein, the term "washing" includes, but is not limited to, scrubbing, wiping and mechanical agitation.

As will be appreciated by one skilled in the art, the cleaning compositions described above are ideally suited for use in home care (hard surface cleaning compositions) and/or laundry applications.

The composition solution pH is chosen to be the most complimentary to a target surface to be cleaned spanning broad range of pH, from about 5 to about 11. For personal care such as skin and hair cleaning pH of such composition preferably has a pH from about 5 to about 8, and for laundry cleaning compositions pH of from about 5 to about 11. The compositions are preferably employed at concentrations of from about 200 ppm to about 10,000 ppm in solution. The water temperatures preferably range from about 5° C. to about 100° C.

For use in laundry cleaning compositions, the compositions are preferably employed at concentrations from about 200 ppm to about 10000 ppm in solution (or wash liquor). The water temperatures preferably range from about 5° C. to about 60° C. The water to fabric ratio is preferably from about 1:1 to about 20:1.

The method may include the step of contacting a nonwoven substrate impregnated with an embodiment of the compositions described herein. As used herein "nonwoven substrate" may comprise any conventionally fashioned nonwoven sheet or web having suitable basis weight, caliper (thickness), absorbency and strength characteristics. Examples of suitable commercially available nonwoven substrates include those marketed under the tradename SONTARA® by DuPont and POLYWEB® by James River Corp.

As will be appreciated by one skilled in the art, the cleaning compositions described herein are ideally suited for use in liquid dish cleaning compositions. The method for using a liquid dish composition typically comprises the steps of contacting soiled dishes with an effective amount, typically from about 0.5 mL to about 20 mL (per 25 dishes being treated) of the liquid dish cleaning composition.

EXAMPLES

It will be understood that the following Examples are meant to be illustrative only and not to be limiting with respect to the scope of the claims. All parts are by weight unless otherwise specified, and all percentages are by mass unless otherwise specified.

The monomers and intermediates were quantified and measured for various characteristic values by the methods described below.

The intermediate of the cationic group-containing monomer was quantified by liquid chromatography under the conditions shown below. The yield of the cationic group-containing monomer is calculated from the inversion rate determined from the quantified result of the intermediate of the cationic group-containing monomer by liquid chromatography.

Measuring device: product of Hitachi High-Technologies Corporation

Column: CAPCELL PAK C18 MGII 4.6 mm$\phi$×250 mm, 5 μm (product of Shiseido Co., Ltd.)

Temperature: 40.0° C.

Eluant: 0.1% by weight formic acid:acetonitrile=6:4 (volume ratio)

Flow velocity: 1.0 mL/min

Detector: RI, UV (detection wavelength: 210 nm)

The ethylene oxide adduct of isoprenol is quantified by high-speed chromatography under the following conditions:

Measuring device: 8020 series (product of Tosoh Corp.)

Column: CAPCELL PAK C1 UG120 (product of Shiseido Co., Ltd.)

Temperature: 40.0° C.

Eluant: dodecahydrate solution of 10 mmol/L disodium hydrogen phosphate (pH 7 (controlled with phosphoric acid)):acetonitrile=45:55 (volume ratio)

Flow velocity: 1.0 mL/min

Detector: RI, UV (detection wavelength: 215 nm)

The carboxyl group-containing monomer and other compounds are quantified by liquid chromatography under the following conditions:

Measuring device: L-7000 series (product of Hitachi Ltd.)

Detector: UV detector, L-7400 (product of Hitachi Ltd.)

Column: SHODEX RSpak DE-413 (product of Showa Denko K. K.)

Temperature: 40.0° C.

Eluant: 0.1% phosphoric acid aqueous solution

Flow velocity: 1.0 mL/min

Measurement Condition of Weight Average Molecular Weight are as follows:

Measuring device: L-7000 series (product of Hitachi Ltd.)

Detector: HITACHI RI Detector, L-7490

Column: TSK-guard column+TSK-GEL α-3000+ TSK-GEL α-2500 (product of Tosoh Corp.)

Column temperature: 40° C.

Flow velocity: 0.4 mL/min

Calibration curve: POLYETHYLENE GLYCOL (product of GL Sciences, Inc.)

Eluant: 100 mM boric acid (pH 9.2):acetonitrile=4:1 (wt/wt)

A mixture of 1.0 g of an amphoteric polymer composition containing the amphoteric polymer according to embodiments described above, and 1.0 g of water is dried in an oven heated to 130° C. in nitrogen atmosphere for one hour. The solids content (%) and volatile component content (%) are calculated from the weight change before and after the drying step.

In the following monomer synthesis examples, the following compounds are used as polyalkylene glycol chain-containing monomers represented by the formula (III), described above:

Ethylene oxide (average 10 mol) adduct of isoprenol having a hydroxyl value of 106.5 (mgKOH/g) (hereinafter, also referred to as "IPN10")

Ethylene oxide (average 25 mol) adduct of isoprenol having a hydroxyl value of 47.3 (mgKOH/g) (hereinafter, also referred to as "IPN25")

Ethylene oxide (average 50 mol) adduct of isoprenol having a hydroxyl value of 25.5 (mgKOH/g) (hereinafter, also referred to as "IPN50")

Synthesis Example 1

In a 1-L 4-neck flask, IPN 10 (400 g), epichlorohydrin (351.4 g), and 48% by mass aqueous solution of sodium hydroxide (hereinafter, also referred to as 48% NaOH) (94.9 g) are reacted under stirring for six hours at a controlled temperature of 50° C. Thereafter, the generated salt is removed and epichlorohydrin and water are removed from the remaining organic phase such that a reaction solution (451.2 g) containing an intermediate (IPEG 10) (324.9 g) and IPN 10 (64.1 g) is provided. Subsequently, the reaction solution (451.2 g) containing IPEG 10 (324.9 g) and 30% by mass aqueous solution of trimethylamine chloride (268.7 g) are reacted in the 1-L 4-neck flask for eight hours at a controlled temperature of 50° C. such that a reaction solution (hereinafter, referred to as monomer composition (1)) (719.9 g) containing cationized IPN 10 (hereinafter, also referred to as IPEC 10) (336.4 g) and IPN 10 (63.8 g) is provided.

Synthesis Example 2

In a 1-L 4-neck flask, IPN 25 (500 g), epichlorohydrin (233.7 g), and NaOH in the pellet form (25.3 g) are reacted under stirring for 16 hours at a controlled temperature of 50° C. Thereafter, the generated salt is removed, and epichlorohydrin and water are removed from the remaining organic phase, such that a reaction solution (499.4 g) containing an intermediate (IPEG 25) (389.1 g) and IPN 25 (43.5 g) is provided. Subsequently, the reaction solution (499.4 g) containing IPEG 25 (389.1 g) and 30% by mass aqueous solution of trimethylamine chloride (143.6 g) are reacted in the 1-L 4-neck flask for 12 hours at a controlled temperature of 50° C. such that a reaction solution (hereinafter, referred to as monomer composition (2)) (643.0 g) containing cationized IPN 25 (hereinafter, also referred to as IPEC 25) (376.7 g) and IPN 25 (41.3 g) is provided.

Synthesis Example 3

In a 200-mL 4-neck flask, IPN 50 (100 g), epichlorohydrin (25.0 g), and NaOH in the pellet form (2.6 g) are reacted under stirring for 16 hours at a controlled temperature of 50° C. Thereafter, the generated salt is removed and epichlorohydrin and water are removed from the remaining organic phase such that a reaction solution (102.3 g) containing an intermediate (IPEG 50) (71.7 g) and IPN 50 (10.0 g) is provided. Subsequently, the reaction solution (102.3 g) containing IPEG 50 (71.7 g) and 30% by mass aqueous solution of trimethylamine chloride (12.6 g) are reacted in the 200-mL 4-neck flask for 12 hours at a controlled temperature of 50° C. such that a reaction solution (hereinafter, referred to as monomer composition (3)) (114.9 g) containing cationized IPN 50 (hereinafter, also referred to as IPEC 50) (67.2 g) and IPN 50 (9.8 g) is provided.

Synthesis Example 4

IPEG 10 (100.0 g), synthesized in the same manner as in Synthesis Example 1, and diethanolamine (17.4 g) are stirred for eight hours at a controlled temperature of 80° C. such that a monomer composition (4) (117.4 g) is provided. Liquid chromatography analysis shows that the monomer composition (4) includes the amino compound of IPN 10 represented by the formula (IIA), in which $R^5$ and $R^6$ are —$CH_2CH_2OH$ (hereinafter, also referred to as IPEA 10-DEA) (80.8 g), and IPN 10 (10.2 g).

Synthesis Example 5

IPEG 10 (100.0 g), synthesized in the same manner as in Synthesis Example 1, and dibutylamine (23.2 g) are stirred for eight hours at a controlled temperature of 100° C. such that a monomer composition (5) (123.2 g) is provided. Liquid chromatography analysis shows that the monomer composition (5) includes the amino compound of IPN 10 represented by the formula (IIA), in which $R^5$ and $R^6$ are —$C_4H_9$ (hereinafter, also referred to as IPEA 10-DBuA) (83.6 g), and IPN 10 (10.2 g).

Preparation of Amphoteric Polymers

Example 1

In a 1000-mL glass separable flask equipped with a reflux condenser and a stirrer (paddle blade), pure water (100.0 g) and Mohr's salt (0.0057 g) are stirred while the temperature is increased to 70° C. such that the polymerization reaction system is prepared. To the polymerization reaction system being stirred and controlled to 70° C., 80% acrylic acid aqueous solution (hereinafter, referred to as 80% AA) (148.5 g), the monomer composition (1) (174.2 g), IPN 10 (36.2 g), 15% sodium persulfate aqueous solution (hereinafter, referred to as 15% NaPS) (90.9 g), 35% sodium hydrogen sulfite (hereinafter, referred to as 35% SBS) (16.7 g), and pure water (147.5 g) are added dropwise through different nozzles.

The drop-wise addition of each solution is started at the same time. The drop-wise addition times of 80% AA, the monomer composition (1), IPN 10, 15% NaPS, 35% SBS, and pure water are 180 minutes, 120 minutes, 120 minutes, 190 minutes, 180 minutes, and 180 minutes, respectively. The drop rate of each solution is constant, and each solution is continuously added dropwise. After the drop-wise addition of 15% NaPS, the reaction solution is maintained (matured) at 70° C. for more 30 minutes and the polymerization is completed. After the completion of polymerization, the polymerization reaction solution is stirred and left standing to be cooled, and then is neutralized with 48% sodium hydroxide (hereinafter, abbreviated as 48% NaOH) (96.3 g). Through these steps, a copolymer composition (1) containing a copolymer (1) is prepared. The solids content of the copolymer composition (1) is 45%.

Example 2

In a 1000-mL glass separable flask equipped with a reflux condenser and a stirrer (paddle blade), pure water (100.0 g) and Mohr's salt (0.0057 g) are stirred while the temperature is increased to 70° C., such that the polymerization reaction system is prepared. To the polymerization reaction system being stirred and controlled to 70° C., 80% AA (150.3 g), the monomer composition (1) (44.1 g), IPN10 (144.4 g), 15% NaPS (93.5 g), 35% SBS (17.2 g), and pure water (162.4 g) are added dropwise through different nozzles.

The drop-wise addition of each solution is started at the same time. The drop-wise addition times of 80% AA, the monomer composition (1), IPN 10, 15% NaPS, 35% SBS, and pure water are 180 minutes, 120 minutes, 120 minutes, 190 minutes, 180 minutes, and 180 minutes, respectively. The drop rate of each solution is constant, and each solution is continuously added dropwise. After the drop-wise addition of 15% NaPS, the reaction solution is maintained (matured) at 70° C. for an additional 30 minutes, and the polymerization is completed. After the completion of polymerization, the polymerization reaction solution is stirred and left standing to be cooled, and then is neutralized with 48% NaOH (97.4 g). Through these steps, a copolymer composition (2) containing a copolymer (2) is prepared. The solids content of the copolymer composition (2) is 45%.

Example 3

In a 1000-mL glass separable flask equipped with a reflux condenser and a stirrer (paddle blade), pure water (100.0 g) and Mohr's salt (0.0056 g) are stirred while the temperature is increased to 70° C. such that the polymerization reaction system is prepared. To the polymerization reaction system being stirred and controlled to 70° C., 80% AA (270.0 g), the monomer composition (1) (39.6 g), IPN10 (21.7 g), 15% NaPS (61.9 g), 35% SBS (53.0 g), and pure water (82.3 g) are added dropwise through different nozzles. The drop-wise addition of each solution is started at the same time. The drop-wise addition times of 80% AA, the monomer composition (1), IPN 10, 15% NaPS, 35% SBS, and pure water are 180 minutes, 150 minutes, 150 minutes, 190 minutes, 180 minutes, and 150 minutes, respectively. The drop rate of each solution is constant, and each solution is continuously added dropwise. After the drop-wise addition of 15% NaPS, the reaction solution is maintained (matured) at 70° C. for an additional 30 minutes, and the polymerization is completed. After the completion of polymerization, the polymerization reaction solution is stirred and left standing to be cooled, and then is neutralized with 48% NaOH (175.0 g). Through these steps, a copolymer composition (3) containing a copolymer (3) is prepared. The solids content of the copolymer composition (3) is 45%.

Example 4

In a 1000-mL glass separable flask equipped with a reflux condenser and a stirrer (paddle blade), pure water (100.0 g) and Mohr's salt (0.0057 g) are stirred while the temperature is increased to 70° C., such that the polymerization reaction system is prepared. To the polymerization reaction system being stirred and controlled to 70° C., 80% AA (145.8 g), the monomer composition (1) (17.1 g), IPN10 (161.0 g), 15% NaPS (65.0 g), 35% SBS (55.7 g), and pure water (166.6 g) are added dropwise through different nozzles. The drop-wise addition of each solution is started at the same time.

The drop-wise addition times of 80% AA, the monomer composition (1), IPN 10, 15% NaPS, 35% SBS, and pure water are 180 minutes, 120 minutes, 120 minutes, 190 minutes, 180 minutes, and 120 minutes, respectively. The drop rate of each solution is constant, and each solution is continuously added dropwise. After the drop-wise addition of 15% NaPS, the reaction solution is maintained (matured) at 70° C. for more 30 minutes, and the polymerization is completed. After the completion of polymerization, the polymerization reaction solution is stirred and left standing to be cooled, and then is neutralized with 48% NaOH (94.5 g). Through these steps, a copolymer composition (4) containing a copolymer (4) is prepared. The solids content of the copolymer composition (4) is 45%.

Example 5

In a 1000-mL glass separable flask equipped with a reflux condenser and a stirrer (paddle blade), pure water (100.0 g) and Mohr's salt (0.0056 g) are stirred while the temperature is increased to 70° C., such that the polymerization reaction system is prepared. To the polymerization reaction system being stirred and controlled to 70° C., 80% AA (256.5 g), the monomer composition (1) (15.0 g), IPN10 (39.0 g), 15% NaPS (98.1 g), 35% SBS (84.1 g), and pure water (43.5 g) are added dropwise through different nozzles.

The drop-wise addition of each solution is started at the same time. The drop-wise addition times of 80% AA, the monomer composition (1), IPN 10, 15% NaPS, 35% SBS, and pure water are 180 minutes, 150 minutes, 150 minutes, 190 minutes, 180 minutes, and 150 minutes, respectively. The drop rate of each solution is constant, and each solution is continuously added dropwise. After the drop-wise addition of 15% NaPS, the reaction solution is maintained (matured) at 70° C. for more 30 minutes and the polymerization is completed. After the completion of polymerization, the polymerization reaction solution is stirred and left standing to be cooled, and then is neutralized with 48% NaOH (166.3 g). Through these steps, a copolymer composition (5) containing a copolymer (5) is prepared. The solids content of the copolymer composition (5) is 45%.

Example 6

In a 300-mL glass separable flask equipped with a reflux condenser and a stirrer (paddle blade), pure water (20.9 g) and Mohr's salt (0.0009 g) were stirred while the temperature is increased to 70° C. such that the polymerization reaction system is prepared. To the polymerization reaction system being stirred and controlled to 70° C., 80% AA (31.5 g), the monomer composition (1) (2.5 g), IPN10 (14.8 g), 15% NaPS (12.7 g), 35% SBS (10.9 g), and pure water (10.0 g) are added dropwise through different nozzles.

The drop-wise addition of each solution is started at the same time. The drop-wise addition times of 80% AA, the monomer composition (1), IPN 10, 15% NaPS, 35% SBS, and pure water are 180 minutes, 150 minutes, 150 minutes, 190 minutes, 180 minutes, and 180 minutes, respectively. The drop rate of each solution was constant and each solution are continuously added dropwise. After the drop-wise addition of 15% NaPS, the reaction solution is maintained (matured) at 70° C. for an additional 30 minutes, and the polymerization is completed. After the completion of polymerization, the polymerization reaction solution is stirred and left standing to be cooled, and then is neutralized with 48% NaOH (20.4 g). Through these steps, a copolymer composition (6) containing a copolymer (6) is prepared. The solids content of the copolymer composition (6) is 45%.

Example 7

In a 300-mL glass separable flask equipped with a reflux condenser and a stirrer (paddle blade), pure water (19.5 g) and Mohr's salt (0.0009 g) are stirred while the temperature is increased to 70° C., such that the polymerization reaction system is prepared. To the polymerization reaction system being stirred and controlled to 70° C., 80% AA (31.5 g), the monomer composition (1) (18.5 g), IPN10 (1.7 g), 15% NaPS (12.6 g), 35% SBS (10.8 g), and pure water (10.0 g) are added dropwise through different nozzles.

The drop-wise addition of each solution is started at the same time. The drop-wise addition times of 80% AA, the monomer composition (1), IPN 10, 15% NaPS, 35% SBS, and pure water are 180 minutes, 150 minutes, 150 minutes, 190 minutes, 180 minutes, and 180 minutes, respectively. The drop rate of each solution was constant and each aqueous solution is continuously added dropwise. After the drop-wise addition of 15% NaPS, the reaction solution is maintained (matured) at 70° C. for an additional 30 minutes, and the polymerization is completed. After the completion of polymerization, the polymerization reaction solution is stirred and left standing to be cooled, and then is neutralized with 48% NaOH (20.4 g). Through these steps, a copolymer composition (7) containing a copolymer (7) is prepared. The solids content of the copolymer composition (7) is 45%.

Example 8

In a 300-mL glass separable flask equipped with a reflux condenser and a stirrer (paddle blade), pure water (26.9 g) and Mohr's salt (0.0009 g) are stirred while the temperature is increased to 70° C., such that the polymerization reaction system is prepared. To the polymerization reaction system being stirred and controlled to 70° C., 80% AA (22.5 g), the monomer composition (1) (33.0 g), IPN10 (0.1 g), 15% NaPS (13.7 g), 35% SBS (2.5 g), and pure water (10.0 g) are added dropwise through different nozzles.

The drop-wise addition of each solution is started at the same time. The drop-wise addition times of 80% AA, the monomer composition (1), IPN 10, 15% NaPS, 35% SBS, and pure water are 180 minutes, 150 minutes, 150 minutes, 190 minutes, 180 minutes, and 180 minutes, respectively. The drop rate of each solution is constant and each aqueous solution is continuously added dropwise. After the drop-wise addition of 15% NaPS, the reaction solution is maintained (matured) at 70° C. for an additional 30 minutes, and the polymerization is completed. After the completion of polymerization, the polymerization reaction solution is stirred and left standing to be cooled, and then is neutralized with 48% NaOH (14.6 g). Through these steps, a copolymer composition (8) containing a copolymer (8) is prepared. The solids content of the copolymer composition (8) is 45%.

Example 9

In a 300-mL glass separable flask equipped with a reflux condenser and a stirrer (paddle blade), pure water (74.9 g), the monomer composition (1) (33.9 g), maleic acid (hereinafter, referred to as MA) (10.1 g), and 35% hydrogen peroxide solution (hereinafter, referred to as 35% $H_2O_2$) (0.3 g) are stirred while the temperature is increased to 60° C., such that the polymerization reaction system is prepared. To the polymerization reaction system being stirred and controlled to 60° C., 1.5% L-ascorbic acid aqueous solution (hereinafter, referred to as 1.5% L-AS) (7.9 g) is added dropwise all at once.

Thereafter, the reaction solution is maintained (matured) at 60° C. for 60 minutes, and the polymerization is completed. After the completion of polymerization, the polymerization reaction solution is stirred and left standing to be cooled. Pure water (26.0 g) and 48% NaOH (13.0 g) are added to neutralize the polymerization reaction solution. Through these steps, a copolymer composition (9) containing a copolymer (9) is prepared. The solids content of the copolymer composition (9) is 25%.

Example 10

In a 1000-mL glass separable flask equipped with a reflux condenser and a stirrer (paddle blade), pure water (150.0 g) and Mohr's salt (0.0057 g) are stirred while the temperature is increased to 70° C., such that the polymerization reaction system is prepared. To the polymerization reaction system being stirred and controlled to 70° C., 80% AA (158.4 g), the monomer composition (2) (55.7 g), IPN 25 (189.2 g), 15% NaPS (92.3 g), 35% SBS (17.0 g), and pure water (48.3 g) are added dropwise through different nozzles.

The drop-wise addition of each solution is started at the same time. The drop-wise addition times of 80% AA, the monomer composition (2), IPN 25, 15% NaPS, 35% SBS, and pure water are 180 minutes, 150 minutes, 150 minutes, 190 minutes, 180 minutes, and 180 minutes, respectively. The drop rate of each solution is constant and each aqueous solution is continuously added dropwise. After the drop-wise addition of 15% NaPS, the reaction solution is maintained (matured) at 70° C. for an additional 30 minutes, and the polymerization is completed. After the completion of polymerization, the polymerization reaction solution is stirred and left standing to be cooled, and then is neutralized with 48% NaOH (102.7 g). Through these steps, a copolymer composition (10) containing a copolymer (10) is prepared. The solids content of the copolymer composition (10) is 45%.

Example 11

In a 1000-mL glass separable flask equipped with a reflux condenser and a stirrer (paddle blade), pure water (150.0 g) and Mohr's salt (0.0057 g) are stirred while the temperature is increased to 70° C., such that the polymerization reaction system is prepared. To the polymerization reaction system being stirred and controlled to 70° C., 80% AA (288.0 g), the monomer composition (2) (50.6 g), IPN 25 (28.0 g), 15% NaPS (65.5 g), 35% SBS (46.8 g), and pure water (0.4 g) are added dropwise through different nozzles.

The drop-wise addition of each solution is started at the same time. The drop-wise addition times of 80% AA, the monomer composition (2), IPN 25, 15% NaPS, 35% SBS, and pure water are 180 minutes, 150 minutes, 150 minutes, 190 minutes, 180 minutes, and 180 minutes, respectively. The drop rate of each solution is constant and each solution is continuously added dropwise. After the drop-wise addition of 15% NaPS, the reaction solution is maintained (matured) at 70° C. for an additional 30 minutes, and the polymerization is completed. After the completion of polymerization, the polymerization reaction solution is stirred and left standing to be cooled, and then is neutralized with 48% NaOH (186.7 g). Through these steps, a copolymer composition (11) containing a copolymer (11) is prepared. The solids content of the copolymer composition (11) is 45%.

Example 12

In a 1000-mL glass separable flask equipped with a reflux condenser and a stirrer (paddle blade), pure water (150.0 g), and Mohr's salt (0.0061 g) are stirred while the temperature is increased to 70° C., such that the polymerization reaction system is prepared. To the polymerization reaction system being stirred and controlled to 70° C., 80% AA (162.0 g), the monomer composition (4) (89.9 g), IPN 10 (116.6 g), 15% NaPS (99.9 g), 35% SBS (18.3 g), and pure water (126.1 g) are added dropwise through different nozzles.

The drop-wise addition of each solution is started at the same time. The drop-wise addition times of 80% AA, the monomer composition (4), IPN 10, 15% NaPS, 35% SBS, and pure water were 180 minutes, 120 minutes, 120 minutes, 190 minutes, 180 minutes, and 180 minutes, respectively. The drop rate of each solution is constant, and each solution is continuously added dropwise. After the drop-wise addition of 15% NaPS, the reaction solution is maintained (matured) at 70° C. for an additional 30 minutes, and the polymerization is completed. After the completion of polymerization, the polymerization reaction solution is stirred and left standing to be cooled, and then is neutralized with 48% NaOH (105.0 g). Through these steps, a copolymer composition (12) containing a copolymer (12) is prepared. The solids content of the copolymer composition (12) is 45%.

Example 13

In a 1000-mL glass separable flask equipped with a reflux condenser and a stirrer (paddle blade), pure water (150.0 g), and Mohr's salt (0.0061 g) are stirred while the temperature is increased to 70° C., such that the polymerization reaction system is prepared. To the polymerization reaction system being stirred and controlled to 70° C., 80% AA (162.0 g), the monomer composition (5) (89.9 g), IPN 10 (117.9 g), 15% NaPS (120.5 g), 35% SBS (18.3 g), and pure water (120.5 g) are added dropwise through different nozzles.

The drop-wise addition of each solution is started at the same time. The drop-wise addition times of 80% AA, the monomer composition (5), IPN 10, 15% NaPS, 35% SBS, and pure water are 180 minutes, 120 minutes, 120 minutes, 190 minutes, 180 minutes, and 180 minutes, respectively. The drop rate of each solution is constant, and each solution is continuously added dropwise. After the drop-wise addition of 15% NaPS, the reaction solution is maintained (matured) at 70° C. for an additional 30 minutes, and the polymerization is completed. After the completion of polymerization, the polymerization reaction solution is stirred and left standing to be cooled, and then is neutralized with 48% NaOH (105.0 g). Through these steps, a copolymer composition (13) containing a copolymer (13) is prepared. The solids content of the copolymer composition (13) is 45%.

Example 13

In a 1000-mL glass separable flask equipped with a reflux condenser and a stirrer (paddle blade), pure water (150.0 g) and Mohr's salt (0.0058 g) are stirred while the temperature is increased to 70° C., such that the polymerization reaction system was prepared. To the polymerization reaction system being stirred and controlled at 70° C., 80% AA (315.0 g), the monomer composition (1) (19.7 g), 15% NaPS (70.5 g) and 35% SBS (60.4 g) are added dropwise through different nozzles.

The drop-wise addition of each solution is started at the same time. The drop-wise addition times of 80% AA, the monomer composition (1), 15% NaPS and 35% SBS are 180 minutes, 180 minutes, 190 minutes, and 180 minutes, respectively. The drop rate of each solution is constant and each solution is continuously added dropwise. After the drop-wise addition of 15% NaPS, the reaction solution is maintained (matured) at 70° C. for more an additional 30 minutes and the polymerization is completed. After the completion of polymerization, the polymerization reaction solution is stirred and left standing to be cooled, and then is neutralized with 48% NaOH (204.2 g). Through these steps, a copolymer composition (14) containing a copolymer (14) is prepared. The solids content of the copolymer composition (14) is 41%.

Comparative Example 1

In a 500-mL glass separable flask equipped with a reflux condenser tube and a stirrer, pure water (75.0 g) and Mohr's salt (0.0025 g) were stirred while the temperature was increased to 70° C. Thereafter, 80% AA (65.0 g), an aqueous solution of 80% IPN 25 (97.5 g), 15% NaPS (26.3 g), and 35% SBS (22.5 g) were added dropwise through different nozzles. The drop-wise addition times of 80% AA, 80% IPN 25, 15% NaPS, and 35% SBS were 180 minutes, 150 minutes, 190 minutes, and 180 minutes, respectively. The drop-wise addition of each solution was started at the same time. The temperature was controlled to 70° C. until the completion of drop-wise addition of 15% NaPS. The resulting solution was matured at the same controlled temperature for 30 minutes after the completion of drop-wise addition of 15% NaPS, and the polymerization was completed. After the completion of polymerization, the polymerization reaction solution was left standing to be cooled and then was neutralized with 48% NaOH (42.1 g). Through these steps, a comparison polymer composition (1) containing a comparison polymer (1) was prepared. The solids content of the comparison polymer composition (1) was 45%.

Comparative Example 2

In a 1000-mL glass separable flask equipped with a reflux condenser tube and a stirrer, pure water (169.2 g), an aqueous solution of 60% IPN 50 (350.0 g), and Mohr's salt (0.0056 g) were stirred while the temperature was increased to 90° C. Thereafter, 80% AA (112.5 g), 15% NaPS (35.8 g), and 35% SBS (30.7 g) were added dropwise through different nozzles. The drop-wise addition times of 80% AA, 15% NaPS, and 35% SBS were 180 minutes, 210 minutes, and 180 minutes, respectively. The drop-wise addition of each solution was started at the same time. The temperature was controlled to 90° C. until the completion of drop-wise addition of 15% NaPS. The reaction solution was matured at the same controlled temperature for 30 minutes after the completion of drop-wise addition of 15% NaPS. After the completion of polymerization, the polymerization reaction solution was left standing to be cooled and then was neutralized with 48% NaOH (95.8 g). Through these steps, a comparison polymer composition (2) containing a comparison polymer (2) was prepared. The solids content of the comparison polymer composition (2) was 45%.

Copolymer Characterizations

The copolymer compositions (1) to (14) were evaluated by $^1$H-NMR analysis. No peaks representing the monomers were found, indicating that the composition of each polymer corresponds to the composition of the used materials. The copolymers (1) to (14) prepared in Examples 1 to 14 and the comparison polymers (1) and (2) prepared in Comparative Examples 1 and 2 were evaluated for performance as described below. TABLES 1 and 2 show the results.

Compatibility with Surfactant

Detergent compositions each containing a test sample (polymer or polymer composition) are prepared using the following materials:

SFT-70H (polyoxyethylene alkyl ether, product of NIPPON SHOKUBAI Co., Ltd.): 40 g NEOPELEX F-65 (sodium dodecylbenzene sulfonate, product of Kao Corp.): 7.7 g (active ingredient: 5 g)

Kohtamin 86W (stearyl trimethylammonium chloride, product of Kao Corp.): 17.9 g (active ingredient: 5 g)

Diethanolamine: 5 g

Ethanol: 5 g

Propylene glycol: 5 g

Test sample: 1.5 g (based on solids content)

Ion exchange water: balance to provide 100 g of detergent composition.

The mixture is sufficiently stirred so that all the components are uniformly dispersed. Turbidity (kaolin turbidity, mg/L) of the mixture is evaluated by turbidity measured at 25° C. with a turbidimeter ("NDH2000", product of Nippon Denshoku Co., Ltd.).

The evaluation summarized in TABLE 1 is based on the following criteria:

Good: Kaolin turbidity of not less than 0 and less than 50 mg/L; phase separation, sedimentation, and turbidity were not visually observed.

Intermediate: Kaolin turbidity of not less than 50 mg/L and less than 200 mg/L; slight turbidity was visually observed.

Bad: Kaolin turbidity of not less than 200 mg/L; turbidity was visually observed.

TABLE 1

Surfactant compatibility of example copolymers

| Example | Polymer | Composition (wt %) | $M_w$ | Surfactant Compatibility |
|---|---|---|---|---|
| Example 1 | copolymer (1) | IPEC10/IPN10/AA 40/20/40 | 51000 | Good |
| Example 2 | copolymer (2) | IPEC10/IPN10/AA 10/50/40 | 53000 | Good |

TABLE 1-continued

Surfactant compatibility of example copolymers

| Example | Polymer | Composition (wt %) | $M_w$ | Surfactant Compatibility |
|---|---|---|---|---|
| Example 3 | copolymer (3) | IPEC10/IPN10/AA 10/10/80 | 25000 | Good |
| Example 4 | copolymer (4) | IPEC10/IPN10/AA 4/56/40 | 24000 | Good |
| Example 5 | copolymer (5) | IPEC10/IPN10/AA 4/16/80 | 21000 | Good |
| Example 6 | copolymer (6) | IPEC10/IPN10/AA 4/36/60 | 62000 | Good |
| Example 7 | copolymer (7) | IPEC10/IPN10/AA 30/10/60 | 22000 | Good |
| Example 8 | copolymer (8) | IPEC10/IPN10/AA 50/10/40 | 59000 | Good |
| Example 9 | copolymer (9) | IPEC10/IPN10/MA 52/22/27 | 78000 | Good |
| Example 10 | copolymer (10) | IPEC25/IPN25/AA 10/50/40 | 54000 | Good |
| Example 11 | copolymer (11) | IPEC25/IPN25/AA 10/10/80 | 33000 | Good |
| Example 12 | copolymer (12) | IPEA10-DEA/IPN10/AA 20/40/40 | 36000 | Good |
| Example 13 | copolymer (13) | IPEA10-DBuA/IPN10/AA 20/40/40 | 32000 | Good |
| Example 14 | copolymer (14) | IPEC10/IPN10/AA 5/1/94 | 30000 | Good |
| Comparative Example 1 | comparison polymer (1) | IPN10/AA 60/40 | 22000 | Good |
| Comparative Example 2 | comparison polymer (2) | IPN50/AA 70/30 | 20000 | Good |

Anti-Soil Redeposition Ability Test

Anti-soil redeposition ability is tested by the following procedure using JIS Z8901 Test Powders I Class 11 (typical analysis, 34.0-40.0 wt. % $SiO_2$, 26.0-32.0 wt. % $Al_2O_3$, 3.0-7.0 wt. % MgO, 17.0-23.0% $Fe_2O_3$, 0.0-3.0 wt. % CaO, 0.0-4.0 wt. % $TiO_2$, with particle sizes from less than 1 µm to about 8 µm):

(1) New white cotton cloth (Bleached, mercerized Cotton Twill as per ISO Doc 509 Series 6, Part 1, available from Testfabrics, Inc, 415 Delaware Avenue, PO Box #26, West Pittiston, Pa. 18643, USA), is cut into 5 cm×5 cm white cloths. The degree of whiteness is determined for the white cloths by measuring the reflectance with a colorimetric color difference meter (SE2000, product of Nippon Denshoku Industries Co., Ltd.).

(2) Deionized water (20 L) is added to calcium chloride dihydrate (5.88 g) such that hard water is prepared.

(3) Deionized water (100 mL) is added to sodium linear alkylbenzene sulfonate (8.0 g), sodium bicarbonate (9.5 g), and sodium sulfate (8.0 g) such that a surfactant aqueous solution is prepared. The pH is adjusted to 10.

(4) A terg-o-tometer (available from S. R. Lab Instruments, G-16, M. K. Industrial Premises Co-Op. Soc., Sonawala "X" Road No. 2, Goregaon (East), Mumbai-400 063 Maharashtra, India) is set at 25° C. Hard water (2 L), the surfactant aqueous solution (5 mL), 0.8% (based on solids content) test polymer aqueous solution (5 g), zeolite (0.30 g), and JIS test powders I Class 11 (1.0 g) (Japanese Industrial Standard powders, available from The Association of Powder Process Industry and Engineering, Kyoto JAPAN) are mixed, and are added to and stirred for one minute in each terg-o-tometer pot at 100 rpm. Subsequently, seven white cloths are put into each pot, and the mixture plus cloths are stirred for ten minutes at 100 rpm.

(5) Rinse Step. The original abovementioned wash water is discarded, the white cloths are wringed by hand, the cloths are returned into each terg-o-tometer pot, and then fresh hard water (2 L) at 25° C. is poured into each terg-o-tometer pot and stirred at 100 rpm for two minutes.

(6) The white clothes are ironed (at approximately 200° C.) with a cloth thereon to dry them while wrinkles are smoothed. The clothes are measured again for reflectance as whiteness with the colorimetric difference meter.

(7) The anti-soil redeposition ratio is determined from the following formula, based on the measurement results. Anti-soil redeposition ratio (%)=(whiteness of white cloth after washed)/(whiteness of original white cloth)×100. Data for selected copolymers are provided in TABLE 2.

TABLE 2

Anti-soil redeposition ratio of selected example copolymers

| Example | Polymer | Anti-Soil Redeposition Ability (%) |
|---|---|---|
| Example 2 | copolymer (2) | 77.5 |
| Example 3 | copolymer (3) | 76.5 |
| Example 7 | copolymer (7) | 78.6 |
| Example 11 | copolymer (11) | 77.4 |
| Example 14 | copolymer (14) | 78.8 |
| Comparative Example 1 | comparative polymer (1) | 76.1 |
| Comparative Example 2 | comparative polymer (2) | 75.4 |

The results shown in TABLES 1 and 2 indicate that the copolymers (1) to (14) and the comparison polymers (1) and (2) were all highly compatible with surfactants but that the inventive copolymers (2), (3), (7), (11), and (14) have higher anti-soil redeposition ability compared to the comparison polymers (1) and (2). These results suggest the technical importance of use of the amphoteric polymer of a specific structure.

Clay Dispersancy Test

Preparation—The clay dispersancy procedure is run with a Phipps and Bird PB-700 Standard Jartester (available from Phipps and Bird Co, 1519 Summit Avenue, Richmond, Va. 23230, USA) using jacketed glass beakers (about 1 L each, referred to hereinafter as "pots") with temperature set at 30° C. A wash solution is prepared. The experiment can be run by varying selected washing conditions, such as buffer conditions, buffer/surfactant ratios, and degrees of hardness. Polymer compositions are evaluated using a detergent concentration of 2,000 ppm, the detergent comprising LAS (linear alkylbenzene sulfonate) at 15 wt. %, $AE_3S$ (alkyl ethoxy sulfate with average 3 moles ethoxylation) at 1.5 wt. %, Zeolite at 10 wt. %, and Sodium Carbonate at 12 wt. % (all wt. % based on the total weight of the detergent composition), with a pH of 10.5 and a hardness of 17 gpg (Ca/Mg=3/1). Stock solutions of polymer are made at 28,000 ppm polymer.

The reference polymer is linear sodium polyacrylate (LSPA) with a molecular weight of 4500 Da. US clay (available from Empirical Manufacturing Company, 7616 Reinhold Drive, Cincinnati, Ohio, 45237-3208) is weighed out for each pot in a glass vial to give 1000 ppm of clay when the clay is added to 750 g of wash solution in each pot. A standard laboratory UV/VIS spectrophotometer with a path length of 10 mm and a constant-temperature circulating bath set to 30° C. is used for the characterization. The absorbance value on the UV/VIS spectrophotometer is set to 520 nm. A blank UV/VIS measurement is made for the wash solution. Each pot is filled with 750 g of wash solution, and the stirrer is set to 160 rpm. A pipette is calibrated to weigh out an amount of 28,000-ppm polymer solution to arrive at a final polymer concentration of 20 ppm in each pot. Another pipette is set to 4 mL to withdraw aliquots for the UV/VIS measurements.

Test Procedure—The clay is added to each pot successively at 1-minute intervals. Then, polymers are added to their designated pots successively, also at 1-minute intervals, until all polymers have been added.

As Step 1, after 15 minutes of stirring, three 4-mL aliquots are withdrawn out of each pot, and UV/VIS absorbance at 520 nm is read from the aliquots as the pots are stirred further. As Step 2, the aliquots then are allowed to stand for 30 minutes, after which UV/VIS absorbance is measured from the top of each aliquot (4.0 mL×3). As Step 3, three additional aliquots are removed from the pots, which have continued to be stirred, after a total of 30 minutes has elapsed from when the first aliquots were removed in Step 1. UV/VIS absorbance is measured from the tops of each of the additional aliquots.

The clay "dispersancy value," D, at each step is calculated using the equation:

$$D = (\text{UV absorbance value of each polymer} / \text{UV absorbance value of LSPA}) * 100.$$

The measurement from Step 1 gives a dispersancy value for "peptization short time." The measurement from Step 2 gives a value for "stability index." The measurement from Step 3 gives a dispersancy value for "peptization long time."

The following data indicate the benefits of the amphoteric polymers according to embodiments described herein. Clay dispersancy peptization of the reference polymer (LSPA with $M_w$ of 4000 Da) was 100, compared to values of 110 and 104 for two amphoteric polymers according to embodiments described herein. The stability index of the reference polymer was 100, compared to values of 105 and 111 for the same two amphoteric polymers according embodiments described herein.

Composition Formulations

Example 15

Granular Laundry Detergent

Examples of granular laundry detergents including the exemplified amphoteric polymers are provided in TABLE 3.

TABLE 3

Granular Laundry Detergent Compositions

| Formula | A wt % | B wt % | C wt % | D wt % | E wt % |
|---|---|---|---|---|---|
| $C_{11-12}$ Linear alkyl benzene sulphonate | 13-25 | 13-25 | 13-25 | 13-25 | 9-25 |
| $C_{12-18}$ Ethoxylate Sulfate | — | — | 0-3 | — | 0-1 |
| $C_{14-15}$ alkyl ethoxylate (EO = 7) | 0-3 | 0-3 | — | 0-5 | 0-3 |
| Dimethyl hydroxyethyl lauryl ammonium chloride | — | — | 0-2 | 0-2 | 0-2 |
| $C_{8-10}$—N$^+$(CH$_3$)$_2$—(CH$_2$CH$_2$)OH | | | | | |
| Sodium tripolyphosphate | 0-40 | — | 5-33 | 0-22 | 0-15 |
| Zeolite | 0-10 | 20-40 | 0-3 | — | — |
| Silicate builder | 0-10 | 0-10 | 0-10 | 0-10 | 0-10 |
| Carbonate | 0-30 | 0-30 | 0-30 | 5-25 | 0-20 |
| Diethylene triamine penta acetate | 0-1 | 0-1 | 0-1 | 0-1 | 0-1 |
| Polyacrylate | 0-3 | 0-3 | 0-3 | 0-3 | 0-3 |
| Carboxy Methyl Cellulose | 0.2-0.8 | 0.2-0.8 | 0.2-0.8 | 0.2-0.8 | 0.2-0.8 |
| Polymer[1] | 0.05-10 | 0.05-10 | 5.0 | 2.5 | 1.0 |
| Percarbonate | 0-10 | 0-10 | 0-10 | 0-10 | 0-10 |
| Nonanoyloxy-benzenesulfonate | — | — | 0-2 | 0-2 | 0-2 |
| Tetraacetylethylenediamine | — | — | 0-0.6 | 0-0.6 | 0-0.6 |
| Zinc Phthalocyanine Tetrasulfonate | — | — | 0-0.005 | 0-0.005 | 0-0.005 |
| Brightener | 0.05-0.2 | 0.05-0.2 | 0.05-0.2 | 0.05-0.2 | 0.05-0.2 |
| MgSO$_4$ | — | — | 0-0.5 | 0-0.5 | 0-0.5 |
| Enzymes | 0-0.5 | 0-0.5 | 0-0.5 | 0-0.5 | 0-0.5 |
| Minors (perfume, dyes, suds stabilizers) | balance | balance | balance | balance | balance |

[1]An amphoteric polymer according to any of Examples 1-14, or a mixture containing two or more amphoteric polymers according to Examples 1-14.

Example 16

Liquid Laundry Detergents

Examples of liquid laundry detergent formulations comprising amphoteric polymers are provided in TABLES 4, 5, and 6.

TABLE 4

Liquid Laundry detergent formulations A-E

| Ingredient | A wt % | B wt % | C wt % | D wt % | E wt % |
|---|---|---|---|---|---|
| Sodium alkyl ether sulfate | 14.4% | — | 9.2% | 5.4% | — |
| Linear alkylbenzene sulfonic acid | 4.4% | 12.2% | 5.7% | 1.3% | — |
| Alkyl ethoxylate | 2.2% | 8.8% | 8.1% | 3.4% | — |
| Amine oxide | 0.7% | 1.5% | — | — | — |
| Citric acid | 2.0% | 3.4% | 1.9% | 1.0% | 1.6% |
| Fatty acid | 3.0% | 8.3% | — | — | 16.0% |
| Protease | 1.0% | 0.7% | 1.0% | — | 2.5% |
| Amylase | 0.2% | 0.2% | — | — | 0.3% |
| Lipase | — | — | 0.2% | — | — |
| Borax | 1.5% | 2.4% | 2.9% | — | — |
| Calcium and sodium formate | 0.2% | — | — | — | — |
| Formic acid | — | — | — | — | 1.1% |
| Polymer[1] | 1.8% | 2.1% | — | — | 3.2% |
| Sodium polyacrylate | — | — | — | 0.2% | — |
| Sodium polyacrylate copolymer | — | — | 0.6% | — | — |
| DTPA[2] | 0.1% | — | — | — | 0.9% |
| DTPMP[3] | — | 0.3% | — | — | — |
| EDTA[4] | — | — | — | 0.1% | — |
| Fluorescent whitening agent | 0.15% | 0.2% | 0.12% | 0.12% | 0.2% |
| Ethanol | 2.5% | 1.4% | 1.5% | — | — |
| Propanediol | 6.6% | 4.9% | 4.0% | — | 15.7% |
| Sorbitol | — | — | 4.0% | — | — |
| Ethanolamine | 1.5% | 0.8% | 0.1% | — | 11.0% |

TABLE 4-continued

Liquid Laundry detergent formulations A-E

| Ingredient | A wt % | B wt % | C wt % | D wt % | E wt % |
|---|---|---|---|---|---|
| Sodium hydroxide | 3.0% | 4.9% | 1.9% | 1.0% | — |
| Sodium cumene sulfonate | — | 2.0% | — | — | — |
| Silicone suds suppressor | — | 0.01% | — | — | — |
| Perfume | 0.3% | 0.7% | 0.3% | 0.4% | 0.6% |
| Opacifier[5] | — | 0.30% | 0.20% | — | 0.50% |
| Water | balance | balance | balance | balance | balance |
| | 100.0% | 100.0% | 100.0% | 100.0% | 100.0% |

[1]An amphoteric polymer according to any of Examples 1-14, or a mixture containing two or more amphoteric polymers according to Examples 1-14.
[2]diethylenetriaminepentaacetic acid, sodium salt
[3]diethylenetriaminepentakismethylenephosphonic acid, sodium salt
[4]ethylenediaminetetraacetic acid, sodium salt
[5]Acusol OP 301

TABLE 5

Liquid Laundry detergent formulations F-K

| Ingredient | F wt % | G wt % | H wt % | I wt % | J wt % | K wt % |
|---|---|---|---|---|---|---|
| Alkylbenzene sulfonic acid | 7 | 7 | 4.5 | 1.2 | 1.5 | 12.5 |
| Sodium $C_{12-14}$ alkyl ethoxy 3 sulfate | 2.3 | 2.3 | 4.5 | 4.5 | 7 | 18 |
| $C_{14-15}$ alkyl 8-ethoxylate | 5 | 5 | 2.5 | 2.6 | 4.5 | 4 |
| $C_{12}$ alkyl dimethyl amine oxide | — | 2 | — | — | — | — |
| $C_{12-14}$ alkyl hydroxyethyl dimethyl ammonium chloride | — | — | — | 0.5 | — | — |
| $C_{12-18}$ Fatty acid | 2.6 | 3 | 4 | 2.6 | 2.8 | 11 |
| Citric acid | 2.6 | 2 | 1.5 | 2 | 2.5 | 3.5 |
| Protease enzyme | 0.5 | 0.5 | 0.6 | 0.3 | 0.5 | 2 |
| Amylase enzyme | 0.1 | 0.1 | 0.15 | — | 0.05 | 0.5 |
| Mannanase enzyme | 0.05 | — | 0.05 | — | — | 0.1 |
| Alkoxylated Polyalkylenimine Polymer or alkoxylated amine polymer | 1.0 | 0 | 1 | 0.4 | 1.5 | 2.7 |
| Amphoteric Polymer[1] | 0.5 | 1 | 1.5 | 2 | 1 | 0.8 |
| Diethylenetriaminepenta-(methylenephosphonic) acid | 0.2 | 0.3 | — | — | 0.2 | — |
| Hydroxyethane diphosphonic acid | — | — | 0.45 | — | — | 1.5 |
| FWA | 0.1 | 0.1 | 0.1 | — | — | 0.2 |
| Solvents (1,2-propanediol, ethanol), stabilizers | 3 | 4 | 1.5 | 1.5 | 2 | 4.3 |
| Hydrogenated castor oil derivative structurant | 0.4 | 0.3 | 0.3 | 0.1 | 0.3 | — |
| Boric acid | 1.5 | 2 | 2 | 1.5 | 1.5 | 0.5 |
| Na formate | — | — | — | 1 | — | — |
| Reversible protease inhibitor[3] | — | — | 0.002 | — | — | — |
| Perfume | 0.5 | 0.7 | 0.5 | 0.5 | 0.8 | 1.5 |
| Buffers (sodium hydroxide, Monoethanolamine) | To pH 8.2 | | | | | |
| Water and minors (antifoam, aesthetics, . . . ) | To 100% | | | | | |

[1]An amphoteric polymer according to any of Examples 1-13, or a mixture containing two or more amphoteric polymers according to Examples 1-13.

TABLE 6

Liquid Laundry Detergent Formulations L-Q

| Ingredient | L wt % | M wt % | N wt % | O wt % | P wt % | Q wt % |
|---|---|---|---|---|---|---|
| Alkylbenzene sulfonic acid | 5.5 | 2.7 | 2.2 | 12.2 | 5.2 | 5.2 |
| Sodium $C_{12-14}$ alkyl ethoxy 3 sulfate | 16.5 | 20 | 9.5 | 7.7 | 1.8 | 1.8 |
| Sodium $C_{12-14}$ alkyl sulfate | 8.9 | 6.5 | 2.9 | — | — | — |
| $C_{12-14}$ alkyl 7-ethoxylate | — | — | — | — | 0.15 | 0.15 |
| $C_{14-15}$ alkyl 8-ethoxylate | — | — | — | — | 3.5 | 3.5 |
| $C_{12-15}$ alkyl 9-ethoxylate | 1.7 | 0.8 | 0.3 | 18.1 | — | — |
| $C_{12-18}$ Fatty acid | 2.2 | 2.0 | — | 1.3 | 2.6 | 2.6 |
| Citric acid | 3.5 | 3.8 | 2.2 | 2.4 | 2.5 | 2.5 |
| Protease enzyme | 1.7 | 1.4 | 0.4 | — | 0.5 | 0.5 |
| Amylase enzyme | 0.4 | 0.3 | — | — | 0.1 | 0.1 |
| Mannanase enzyme | — | — | — | — | 0.04 | 0.04 |
| Alkoxylated Polyalkylenimine Polymer or alkoxylated amine polymer | 2.1 | 1.2 | 1.0 | 2 | 1.00 | 0.25 |
| Amphoteric polymer | 0.5 | 1 | 1.5 | 3.0 | 1 | 0.8 |
| PEG-PVAc Polymer[2] | — | — | — | — | — | 0.3 |
| Ethoxysulfated Hexamethylene Diamine Dimethyl Quat | — | — | — | — | 1 | 0.7 |
| Diethylenetriaminepenta (methylenephosphonic) acid | — | — | — | — | 0.2 | 0.2 |
| FWA | — | — | — | — | .04 | .04 |
| Solvents (1,2-propanediol, ethanol, stabilizers | 7 | 7.2 | 3.6 | 3.7 | 1.9 | 1.9 |
| Hydrogenated castor oil derivative structurant | 0.3 | 0.2 | 0.2 | 0.2 | 0.35 | 0.35 |
| Polyacrylate | — | — | — | 0.1 | — | — |
| Polyacrylate copolymer[3] | — | — | — | 0.5 | — | — |
| Sodium carbonate | — | — | — | 0.3 | — | — |
| Sodium silicate | — | — | — | — | — | — |
| Borax | 3 | 3 | 2 | 1.3 | — | — |
| Boric acid | 1.5 | 2 | 2 | 1.5 | 1.5 | 1.5 |
| Perfume | 0.5 | 0.5 | 0.5 | 0.8 | 0.5 | 0.5 |
| Buffers (sodium hydroxide, monoethanolamine) | — | — | — | — | 3.3 | 3.3 |
| Water, dyes and miscellaneous | Balance | | | | | |

[1]An amphoteric polymer according to any of Examples 1-14, or a mixture containing two or more amphoteric polymers according to Examples 1-14.
[2]PEG-PVA graft copolymer is a polyvinyl acetate grafted polyethylene oxide copolymer having a polyethylene oxide backbone and multiple polyvinyl acetate side chains. The molecular weight of the polyethylene oxide backbone is about 6000 and the weight ratio of the polyethylene oxide to polyvinyl acetate is about 40 to 60 and no more than 1 grafting point per 50 ethylene oxide units.
[3]Alco 725 (styrene/acrylate)

Example 17

Liquid Dish Handwashing Detergents

Example liquid dish handwashing detergent formulations are provided in TABLE 7.

TABLE 7

Liquid Dish Handwashing Detergent Formulations

| Composition | A | B |
|---|---|---|
| $C_{12-13}$ Natural AE0.6S | 29.0 | 29.0 |
| $C_{10-14}$ mid-branched Amine Oxide | — | 6.0 |
| $C_{12-14}$ Linear Amine Oxide | 6.0 | — |
| SAFOL ® 23 Amine Oxide | 1.0 | 1.0 |
| $C_{11}E_9$ Nonionic[2] | 2.0 | 2.0 |
| Ethanol | 4.5 | 4.5 |
| Polymer[1] | 5.0 | 1.0 |
| Sodium cumene sulfonate | 1.6 | 1.6 |
| Polypropylene glycol 2000 | 0.8 | 0.8 |
| NaCl | 0.8 | 0.8 |
| 1,3 BAC Diamine[3] | 0.5 | 0.5 |

TABLE 7-continued

Liquid Dish Handwashing Detergent Formulations

| Composition | A | B |
|---|---|---|
| Suds boosting polymer[4] | 0.2 | 0.2 |
| Water | Balance | Balance |

[1]An amphoteric polymer according to any of Examples 1-14, or a mixture containing two or more amphoteric polymers according to Examples 1-14.
[2]Nonionic may be either $C_{11}$ Alkyl ethoxylated surfactant containing 9 ethoxy groups.
[3]1,3 BAC is 1,3 bis(methylamine)-cyclohexane.
[4](N,N-dimethylamino)ethyl methacrylate homopolymer Example 18

Automatic Dishwasher Detergent

Example automatic dishwasher detergent formulations are provided in TABLE 8.

TABLE 8

Automatic Dishwasher Detergent Formulations

| | A | B | C | D | E |
|---|---|---|---|---|---|
| Polymer dispersant[2] | 0.5 | 5 | 6 | 5 | 5 |
| Carbonate | 35 | 40 | 40 | 35-40 | 35-40 |
| Sodium tripolyphosphate | 0 | 6 | 10 | 0-10 | 0-10 |
| Silicate solids | 6 | 6 | 6 | 6 | 6 |
| Bleach and bleach activators | 4 | 4 | 4 | 4 | 4 |
| Polymer[1] | 0.05-10 | 1 | 2.5 | 5 | 10 |
| Enzymes | 0.3-0.6 | 0.3-0.6 | 0.3-0.6 | 0.3-0.6 | 0.3-0.6 |
| Disodium citrate dihydrate | 0 | 0 | 0 | 2-20 | 0 |
| Nonionic surfactant[3] | 0 | 0 | 0 | 0 | 0.8-5 |
| Water, sulfate, perfume, dyes and other adjuncts | Balance to 100% | Balance to 100% | Balance to 100% | Balance to 100% | Balance to 100% |

[1]An amphoteric polymer according to any of Examples 1-14, or a mixture containing two or more amphoteric polymers according to Examples 1-14.
[2]Such as ACUSOL ® 445N available from Rohm & Haas or ALCOSPERSE ® from Alco.
[3]Such as SLF-18 POLY TERGENT from the Olin Corporation.

Example 19

Liquid Laundry Detergent Composition in the Form of a Pouch, being Encapsulated by a Film of Polyvinyl Alcohol Example Liquid laundry detergent compositions in pouches are provided in TABLE 9.

TABLE 9

Encapsulated Liquid Laundry Detergent Formulations

| | A | B 3 compartments pouched product Compartment # | | |
|---|---|---|---|---|
| | 1 | 1 | 2 | 3 |
| | Dosage (g) | | | |
| Ingredients | 36.0 wt. % | 34.0 wt. % | 3.5 wt. % | 3.5 wt. % |
| Alkylbenzene sulfonic acid | 14.5 | 14.5 | 20.0 | — |
| $C_{12-14}$ alkyl ethoxy 3 sulfate | 8.5 | 8.5 | — | — |
| $C_{12-14}$ alkyl 7-ethoxylate | 12.5 | 12.5 | 17.0 | — |

TABLE 9-continued

Encapsulated Liquid Laundry Detergent Formulations

| | A | B 3 compartments pouched product Compartment # | | |
|---|---|---|---|---|
| | 1 | 1 | 2 | 3 |
| | Dosage (g) | | | |
| Ingredients | 36.0 wt. % | 34.0 wt. % | 3.5 wt. % | 3.5 wt. % |
| $C_{12-18}$ Fatty acid | 14.5 | 14.5 | 13.0 | — |
| Protease enzyme | 1.5 | 1.5 | — | — |
| Amylase enzyme | 0.2 | — | — | — |
| Mannanase enzyme | 0.1 | — | — | — |
| PAP granule[1] | — | — | — | 50.0 |
| Amphoteric Polymer[2] | 1.5 | 2.0 | — | — |
| Ethoxysulfated Hexamethylene Diamine Dimethyl Quat | 3.0 | — | 2.2 | — |
| PEG-PVAc Polymer[3] | — | — | 2.5 | — |
| Hydroxyethane diphosphonic acid | 1.0 | 0.6 | 0.6 | — |
| Brightener | 0.2 | 0.2 | 0.2 | — |
| Solvents (1,2 propanediol, ethanol), stabilizers | 20 | 20 | 25 | 30.0 |
| Hydrogenated castor oil derivative structurant | 0.1 | — | 0.05 | — |
| Perfume | 1.8 | 1.7 | — | — |
| Buffers (sodium hydroxide, monoethanolamine) | To pH 8.0 for liquid | | | |
| Water and minors (antioxidant, aesthetics, . . . ) | To 100% | | | |

[1]PAP = Phthaloyl-Amino-Peroxycaproic acid, as a 70% active wet cake
[2]An amphoteric polymer according to any of Examples 1-14, or a mixture containing two or more amphoteric polymers according to Examples 1-14.
[3]PEG-PVA graft copolymer is a polyvinyl acetate grafted polyethylene oxide copolymer having a polyethylene oxide backbone and multiple polyvinyl acetate side chains. The molecular weight of the polyethylene oxide backbone is about 6000 and the weight ratio of the polyethylene oxide to polyvinyl acetate is about 40 to 60 and no more than 1 grafting point per 50 ethylene oxide units Unless otherwise noted, all component or composition levels are in reference to the active level of that component or composition, and are exclusive of impurities, for example, residual solvents or by-products, which may be present in commercially available sources.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

"Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern."

"While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention."

All documents cited in the Detailed Description are incorporated herein by reference. The citation of any document is not to be construed as an admission that it is prior art with respect to the present invention.

Unless otherwise defined, all technical and scientific terms used herein have the same meaning as commonly understood by one of ordinary skill in the art to which the invention belongs. The terminology used in the description herein is for describing particular embodiments only and is not intended to be limiting.

As used in the specification and appended claims, the singular forms "a," "an," and "the" are intended to include the plural forms as well, unless the context clearly indicates otherwise.

The term "independently selected from," as used in the specification and appended claims, is intended to mean that the referenced groups can be the same, different, or a mixture thereof, unless the context clearly indicates otherwise. Thus, under this definition, the phrase "$X^1$, $X^2$, and $X^3$ are independently selected from the group consisting of A, B, and C" would include the scenario where $X^1$, $X^2$, and $X^3$ are all the same, where $X^1$, $X^2$, and $X^3$ are all different, and where $X^1$ and $X^2$ are the same but $X^3$ is different.

Though particular embodiments have been illustrated and described, it will be obvious to those skilled in the art that various other changes and modifications can be made without departing from the spirit and scope of the invention. It is therefore intended to cover in the appended claims all such changes and modifications that are within the scope of this invention.

What is claimed is:

1. A cleaning composition comprising an amphoteric polymer and a surfactant system, wherein the amphoteric polymer is formed from a plurality of structure units together defining a total mass, such that:

from 1% to 99% by mass of the plurality of structure units, based on the total mass, are cationic-group structure units having formula (IB) or (IIB):

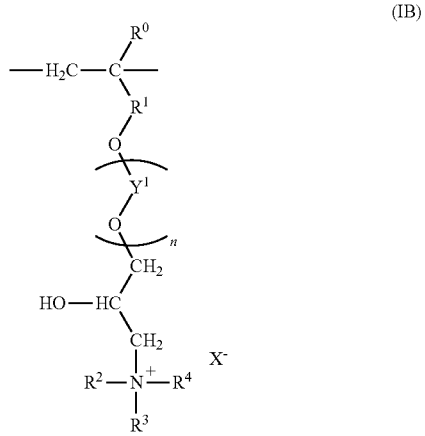

(IB)

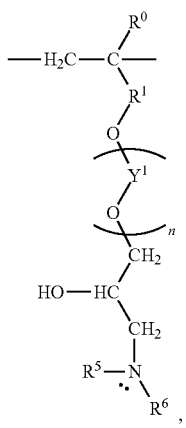

(IIB)

where:
$R^0$ is —H or —$CH_3$;
$R^1$ is —$CH_2$—, —$CH_2CH_2$—, or a direct bond;
$R^2$, $R^3$, and $R^4$ each are independently selected from $C_{1-20}$ organic groups;
$R^5$ and $R^6$ each are independently selected from —H and $C_{1-20}$ organic groups;
each $Y^1$ is independently selected from $C_{2-20}$ alkylene groups;
n is from 1 to 300 and represents an average addition number of moles of oxyalkylene groups (—$Y^1$—O—); and
$X^-$ is a counteranion; and from 1% to 99% by mass of the plurality of structure units, based on the total mass of the plurality of structure units, are carboxyl structure units each derived from a carboxyl group-containing monomer; and wherein the surfactant system comprises at least one $C_{10}$-$C_{16}$ alkyl benzene sulfonate surfactant.

2. The cleaning composition of claim 1, wherein:
from 5% to 40% by mass of the plurality of structure units, based on the total mass, are cationic-group structure units having formula (IB) or (IIB); and
from 30% to 85% by mass of the plurality of structure units, based on the total mass of the plurality of structure units, are carboxyl structure units.

3. The cleaning composition of claim 1, wherein at least one cationic-group structure unit has formula (IB) and at least one cationic-group structure unit has formula (IIB).

4. The cleaning composition of claim 1, wherein each cationic-group structure unit has formula (IB).

5. The cleaning composition of claim 1, wherein each cationic-group structure unit has formula (IIB).

6. The cleaning composition of claim 1, wherein at least one structural unit is an additional structural unit not classified as a cationic-group structure unit or a carboxyl structure unit, up to 60% by mass of the plurality of structure units, based on the total mass, are additional structural units, and wherein the additional structure units are derived from monomers selected from the group consisting of quaternized vinyl aromatic compound-based monomers having a heterocyclic armoatic hydrocarbon group, amino group-containing monomers, sulfonic acid group-containing monomers or salts thereof, polyalkyleneglycol chain-containing monomers, isobutylene, vinyl acetate and mixtures thereof.

7. The cleaning composition of claim 1, wherein the amphoteric polymer has a weight-average molecular weight of from 2,000 to 200,000.

8. The cleaning composition of claim 1, wherein the cleaning composition is selected from the group consisting of liquid laundry detergent compositions, solid laundry detergent compositions, hard surface cleaning compositions, liquid hand dishwashing compositions, solid automatic dishwashing compositions, liquid automatic dishwashing compositions, tab or unit-dose form automatic dishwashing compositions contained within a water-soluble pouch, and laundry detergent compositions contained within a water-soluble pouch.

9. The cleaning composition of claim 1, wherein the cleaning composition comprises from about 0.05% by weight to about 10% by weight of the amphoteric polymer, based on the total weight of the cleaning composition.

10. The cleaning composition of claim 1, wherein the surfactant system further comprises one or more co-surfactant selected from the group consisting of nonionic surfactants, cationic surfactants, anionic surfactants, and mixtures thereof.

11. A cleaning composition comprising an amphoteric polymer and a surfactant system, wherein the amphoteric polymer is formed from a plurality of structure units together defining a total mass, such that:

from 1% to 99% by mass of the plurality of structure units, based on the total mass, are cationic-group structure units having formula (IB) or (IIB):

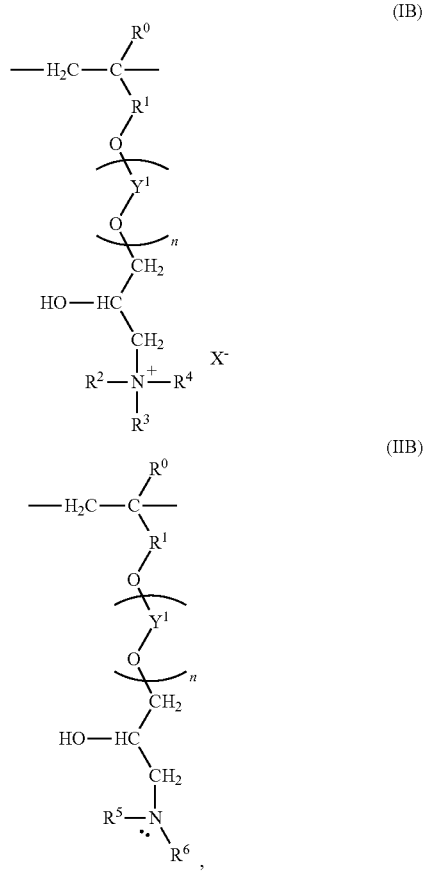

where:
  $R^0$ is —H or —$CH_3$;
  $R^1$ is —$CH_2$—, —$CH_2CH_2$—, or a direct bond;
  $R^2$, $R^3$, and $R^4$ each are independently selected from $C_{1-20}$ organic groups;
  $R^5$ and $R^6$ each are independently selected from —H and $C_{1-20}$ organic groups;
  each $Y^1$ is independently selected from $C_{2-20}$ alkylene groups;
  n is from 1 to 300 and represents an average addition number of moles of oxyalkylene groups (—$Y^1$—O—); and
  $X^{31}$ is a counteranion; and from 1% to 99% by mass of the plurality of structure units, based on the total mass of the plurality of structure units are carbox 1 structure units each derived from a carboxyl group-containing monomer; and wherein the surfactant system comprises at least one $C_8$-$C_{18}$ linear alkyl sulfonate surfactant.

12. The cleaning composition of claim 11, wherein the surfactant system further comprises one or more co-surfactant selected from the group consisting of nonionic surfactants, cationic surfactants, anionic surfactants, and mixtures thereof.

13. The cleaning composition of claim 12, further comprising one or more cleaning adjunct additives.

14. The cleaning composition of claim 11, wherein the cleaning composition comprises from about 0.05% by weight to about 10% by weight of the amphoteric polymer, based on the total weight of the cleaning composition.

15. The cleaning composition of claim 11, wherein at least one cationic-group structure unit has formula (IB) and at least one cationic-group structure unit has formula (IIB).

16. The cleaning composition of claim 11, wherein each cationic-group structure unit has formula (IB).

17. The cleaning composition of claim 11, wherein each cationic-group structure unit has formula (IIB).

18. The cleaning composition of claim 11, wherein at least one structural unit is an additional structural unit not classified as a cationic-group structure unit or a carboxyl structure unit, up to 60% by mass of the plurality of structure units, based on the total mass, are additional structural units, and wherein the additional structure units are derived from monomers selected from the group consisting of quaternized vinyl aromatic compound-based monomers having a heterocyclic armoatic hydrocarbon group, amino group-containing monomers, sulfonic acid group-containing monomers or salts thereof, polyalkyleneglycol chain-containing monomers, isobutylene, vinyl acetate and mixtures thereof.

19. The cleaning composition of claim 11, wherein the amphoteric polymer has a weight-average molecular weight of from 2,000 to 200,000.

20. The cleaning composition of claim 11, wherein the cleaning composition is selected from the group consisting of liquid laundry detergent compositions, solid laundry detergent compositions, hard surface cleaning compositions, liquid hand dishwashing compositions, solid automatic dishwashing compositions, liquid automatic dishwashing compositions, tab or unit-dose form automatic dishwashing compositions contained within a water-soluble pouch, and laundry detergent compositions contained within a water-soluble pouch.

* * * * *